US008788414B2

(12) United States Patent
Sorbe et al.

(10) Patent No.: US 8,788,414 B2
(45) Date of Patent: *Jul. 22, 2014

(54) TRANSFER ACCOUNT SYSTEMS, COMPUTER PROGRAM PRODUCTS, AND COMPUTER-IMPLEMENTED METHODS TO PRIORITIZE PAYMENTS FROM PRESELECTED BANK ACCOUNT

(75) Inventors: Trent Sorbe, Brookings, SD (US); Troy Larson, Brandon, SD (US)

(73) Assignee: Metabank, Sioux Falls, SD (US)

( * ) Notice: Subject to any disclaimer, the term of this patent is extended or adjusted under 35 U.S.C. 154(b) by 374 days.

This patent is subject to a terminal disclaimer.

(21) Appl. No.: 12/338,584

(22) Filed: Dec. 18, 2008

(65) Prior Publication Data

US 2009/0164352 A1 Jun. 25, 2009

Related U.S. Application Data

(60) Provisional application No. 61/016,213, filed on Dec. 21, 2007, provisional application No. 61/052,454, filed on May 12, 2008.

(51) Int. Cl.
G06Q 40/00 (2012.01)
G06Q 30/02 (2012.01)
G06Q 20/20 (2012.01)
G06Q 20/10 (2012.01)
G06Q 20/40 (2012.01)
G06Q 20/14 (2012.01)
G06Q 40/02 (2012.01)

(52) U.S. Cl.
CPC .............. *G06Q 40/00* (2013.01); *G06Q 30/02* (2013.01); *G06Q 40/12* (2013.01); *G06Q 20/20* (2013.01); *G06Q 20/102* (2013.01); *G06Q 20/10* (2013.01); *G06Q 20/40* (2013.01); *G06Q 20/145* (2013.01); *G06Q 40/02* (2013.01); *G06Q 20/105* (2013.01)
USPC ............................................... 705/40; 705/39

(58) Field of Classification Search
None
See application file for complete search history.

(56) References Cited

U.S. PATENT DOCUMENTS 3,752,904 A   8/1973   Waterbury
4,247,759 A   1/1981   Yuris et al.
(Continued)

FOREIGN PATENT DOCUMENTS

EP   0397512 A2   11/1990
EP   0619565 A1   10/1994
(Continued)

OTHER PUBLICATIONS

Jane Boon Pearlstine, Lenders, Borrowers Hook Up Over the Web: Prosper.com and Other Sites Provide Forum for Individual Bidders Willing to Offer Small Loans, Wall Street Journal, May 20, 2006.

(Continued)

*Primary Examiner* — Ryan Zeender
*Assistant Examiner* — H Rojas
(74) *Attorney, Agent, or Firm* — Bracewell & Giuliani LLP

(57) ABSTRACT

A financial institution computer maintains one or more lists of account identifiers for accounts enrolled in a prioritized payment program and receives an automatic deposit associated with an account identifier for a first account enrolled in the prioritized payment program. The prioritized payment program includes pre-authorization of certain payment requests by select creditors. The financial institution computer generates prioritized payments from the first account to select creditors, responsive to one or more unfilled pre-authorized payment requests by the select creditors and then generates a sweep payment from the first account to an associated second account at a second financial institution, responsive to the incoming automatic deposit. A value for the sweep payment is a value of the automatic deposit minus a value of the one or more prioritized payments. The second account can be, for example, a demand deposit account or a prepaid card account.

20 Claims, 8 Drawing Sheets

(56) References Cited

U.S. PATENT DOCUMENTS

| | | |
|---|---|---|
| 4,334,307 A | 6/1982 | Bourgeois et al. |
| 4,439,636 A | 3/1984 | Newkirk et al. |
| 4,449,040 A | 5/1984 | Matsuoka et al. |
| 4,528,643 A | 7/1985 | Freeny, Jr. |
| 4,532,416 A | 7/1985 | Berstein |
| 4,577,061 A | 3/1986 | Katzaff et al. |
| 4,625,276 A | 11/1986 | Benton et al. |
| 4,677,565 A | 6/1987 | Ogaki et al. |
| 4,678,895 A | 7/1987 | Tateisi et al. |
| 4,706,275 A | 11/1987 | Kamal |
| 4,722,054 A | 1/1988 | Yorozu et al. |
| 4,727,243 A | 2/1988 | Saver |
| 4,750,201 A | 6/1988 | Hodgson et al. |
| 4,797,540 A | 1/1989 | Kimizu |
| 4,827,113 A | 5/1989 | Rikuna |
| 4,868,900 A | 9/1989 | McGuire |
| 4,877,947 A | 10/1989 | Mori |
| 4,879,744 A | 11/1989 | Tasaki et al. |
| 4,884,212 A | 11/1989 | Stutsman |
| 4,951,308 A | 8/1990 | Bishop et al. |
| 4,968,873 A | 11/1990 | Dethloff et al. |
| 5,012,077 A | 4/1991 | Takano |
| 5,048,085 A | 9/1991 | Abraham et al. |
| 5,050,207 A | 9/1991 | Hitchcock |
| 5,068,891 A | 11/1991 | Marshall |
| 5,101,098 A | 3/1992 | Naito |
| 5,138,650 A | 8/1992 | Stahl et al. |
| 5,146,067 A | 9/1992 | Sloan et al. |
| 5,148,481 A | 9/1992 | Abraham et al. |
| 5,155,342 A | 10/1992 | Urano |
| 5,163,086 A | 11/1992 | Ahearn et al. |
| 5,192,947 A | 3/1993 | Neustein |
| 5,220,593 A | 6/1993 | Zicker et al. |
| 5,221,838 A | 6/1993 | Gutman et al. |
| 5,225,666 A | 7/1993 | Amarena et al. |
| 5,264,689 A | 11/1993 | Maes et al. |
| 5,265,155 A | 11/1993 | Castro |
| 5,266,782 A | 11/1993 | Alanärä et al. |
| 5,272,320 A | 12/1993 | Hakamada |
| 5,278,752 A | 1/1994 | Narita et al. |
| 5,285,382 A | 2/1994 | Muehlberger et al. |
| 5,327,482 A | 7/1994 | Yamamoto |
| 5,334,821 A | 8/1994 | Campo et al. |
| 5,340,969 A | 8/1994 | Cox |
| 5,352,876 A | 10/1994 | Watanabe et al. |
| 5,359,182 A | 10/1994 | Schilling |
| 5,409,092 A | 4/1995 | Itako et al. |
| 5,416,306 A | 5/1995 | Imahata |
| 5,438,186 A | 8/1995 | Nair et al. |
| 5,442,567 A | 8/1995 | Small |
| 5,448,044 A | 9/1995 | Price et al. |
| 5,465,206 A | 11/1995 | Hilt et al. |
| 5,477,038 A | 12/1995 | Levine et al. |
| 5,504,808 A | 4/1996 | Hamrick, Jr. |
| 5,511,114 A | 4/1996 | Stimson et al. |
| 5,513,117 A | 4/1996 | Small |
| 5,550,358 A | 8/1996 | Tait et al. |
| 5,577,109 A | 11/1996 | Stimson et al. |
| 5,577,121 A | 11/1996 | Davis et al. |
| 5,661,254 A | 8/1997 | Steuer et al. |
| 5,696,908 A | 12/1997 | Muehlberger et al. |
| 5,699,528 A | 12/1997 | Hogan |
| 5,732,136 A | 3/1998 | Murphree et al. |
| 5,814,798 A | 9/1998 | Zancho |
| 5,841,365 A | 11/1998 | Rimkus |
| 5,859,419 A | 1/1999 | Wynn |
| 5,870,721 A | 2/1999 | Norris |
| 5,875,437 A | 2/1999 | Atkins |
| 5,878,141 A | 3/1999 | Daly et al. |
| 5,893,907 A | 4/1999 | Ukuda |
| 5,897,620 A | 4/1999 | Walker et al. |
| 5,920,848 A | 7/1999 | Schutzer et al. |
| 5,923,016 A | 7/1999 | Fredregill et al. |
| 5,933,812 A | 8/1999 | Meyer et al. |
| 5,963,921 A | 10/1999 | Longfield |
| 6,000,608 A | 12/1999 | Dorf |
| 6,012,635 A | 1/2000 | Shimada et al. |
| 6,021,397 A | 2/2000 | Jones et al. |
| 6,032,859 A | 3/2000 | Muehlberger et al. |
| 6,041,308 A | 3/2000 | Walker et al. |
| 6,065,679 A | 5/2000 | Levie et al. |
| 6,112,191 A | 8/2000 | Burke |
| 6,144,948 A | 11/2000 | Walker et al. |
| 6,154,738 A | 11/2000 | Call |
| 6,189,787 B1 | 2/2001 | Dorf |
| 6,208,978 B1 | 3/2001 | Walker et al. |
| 6,249,773 B1 | 6/2001 | Allard et al. |
| 6,253,998 B1 | 7/2001 | Ziarno |
| 6,304,860 B1 | 10/2001 | Martin et al. |
| 6,315,193 B1 | 11/2001 | Hogan |
| 6,450,407 B1 | 9/2002 | Freeman et al. |
| 6,467,684 B2 | 10/2002 | Fite et al. |
| 6,704,714 B1 | 3/2004 | O'Leary et al. |
| 6,739,506 B1 | 5/2004 | Constantine |
| 6,865,544 B1 | 3/2005 | Austin |
| 6,920,434 B1 | 7/2005 | Cossette |
| 6,999,943 B1 | 2/2006 | Johnson et al. |
| 7,010,507 B1 | 3/2006 | Anderson et al. |
| 7,031,939 B1 | 4/2006 | Gallagher et al. |
| 7,072,862 B1 | 7/2006 | Wilson |
| 7,127,452 B1 | 10/2006 | Yashiro |
| 7,177,829 B1 | 2/2007 | Wilson et al. |
| 7,206,761 B2 | 4/2007 | Colvin |
| 7,252,223 B2 | 8/2007 | Schofield |
| 7,258,273 B2 | 8/2007 | Griffin |
| 7,370,076 B2 | 5/2008 | Friedman et al. |
| 7,392,224 B1 | 6/2008 | Bauer et al. |
| 7,398,919 B2 | 7/2008 | Cooper |
| 7,426,492 B1 | 9/2008 | Bishop et al. |
| 7,451,920 B1 | 11/2008 | Rose |
| 7,472,089 B2 | 12/2008 | Hu et al. |
| 7,493,279 B1 | 2/2009 | Kwan |
| 7,509,286 B1 | 3/2009 | Bent et al. |
| 7,546,945 B1 | 6/2009 | Bucci et al. |
| 7,567,936 B1 | 7/2009 | Peckover et al. |
| 7,599,879 B2 | 10/2009 | Louie et al. |
| 7,606,918 B2 | 10/2009 | Holzman et al. |
| 7,607,570 B1 | 10/2009 | Constantine |
| 7,628,319 B2 | 12/2009 | Brown et al. |
| 7,653,591 B1 | 1/2010 | Dabney |
| 7,702,583 B1 | 4/2010 | Hamilton et al. |
| 7,702,587 B2 | 4/2010 | Nguyen et al. |
| 7,752,102 B2 | 7/2010 | Thomas |
| 7,757,944 B2 | 7/2010 | Cline et al. |
| 7,783,571 B2 | 8/2010 | Fish et al. |
| 7,792,717 B1 | 9/2010 | Hankins et al. |
| 7,810,735 B2 | 10/2010 | Madani |
| 7,813,955 B2 | 10/2010 | Ariff et al. |
| 7,814,012 B2 | 10/2010 | Johnson |
| 7,856,399 B2 | 12/2010 | Wilkes |
| 7,865,434 B2 | 1/2011 | Sheets |
| 7,873,569 B1 | 1/2011 | Cahn |
| 7,899,750 B1 | 3/2011 | Klieman et al. |
| 7,904,333 B1 | 3/2011 | Perkowski |
| 7,933,833 B2 | 4/2011 | Hotz et al. |
| 7,954,704 B1 | 6/2011 | Gephart et al. |
| 8,024,242 B2 | 9/2011 | Galit |
| 8,046,256 B2 | 10/2011 | Chien et al. |
| 8,051,006 B1 | 11/2011 | Rourk |
| 8,055,557 B2 | 11/2011 | Sorbe et al. |
| 8,065,187 B2 | 11/2011 | Ahlers et al. |
| 8,069,085 B2 | 11/2011 | Ahlers et al. |
| 8,086,494 B2 | 12/2011 | Dooley et al. |
| 8,090,649 B2 | 1/2012 | Galit et al. |
| 8,103,549 B1 | 1/2012 | Ahlers et al. |
| 8,108,272 B2 | 1/2012 | Sorbe et al. |
| 8,108,279 B2 | 1/2012 | Galit et al. |
| 8,108,977 B1 | 2/2012 | Miller |
| 8,150,764 B2 | 4/2012 | Crowe et al. |
| 8,175,962 B2 | 5/2012 | Galit et al. |
| 8,175,972 B2 | 5/2012 | Galit et al. |
| 8,190,480 B1 | 5/2012 | Ahlers et al. |
| 8,214,286 B1 | 7/2012 | Galit et al. |
| 8,244,611 B2 | 8/2012 | Galit |

(56) References Cited

U.S. PATENT DOCUMENTS

| | | | |
|---|---|---|---|
| 8,244,637 B2 | 8/2012 | Galit et al. |
| 8,260,678 B2 | 9/2012 | Miller |
| 8,266,047 B2 | 9/2012 | Galit |
| 8,286,863 B1 | 10/2012 | Brooks |
| 8,290,853 B2 | 10/2012 | Galit |
| 8,296,227 B2 | 10/2012 | Galit et al. |
| 8,301,557 B1 | 10/2012 | Crowe et al. |
| 8,306,912 B2 | 11/2012 | Galit |
| 8,341,021 B2 | 12/2012 | Ahlers et al. |
| 8,355,984 B1 | 1/2013 | Galit et al. |
| 8,371,502 B1 | 2/2013 | Galit et al. |
| 8,386,375 B2 | 2/2013 | Galit |
| 8,392,299 B2 | 3/2013 | Sorbe et al. |
| 8,392,330 B2 | 3/2013 | Sorbe et al. |
| 8,403,211 B2 | 3/2013 | Brooks et al. |
| 8,485,441 B2 | 7/2013 | Brooks |
| 8,494,960 B2 | 7/2013 | Galit et al. |
| 8,538,879 B2 | 9/2013 | Galit et al. |
| 8,589,295 B2 | 11/2013 | Sorbe et al. |
| 2001/0021925 A1 | 9/2001 | Ukigawa et al. |
| 2001/0034663 A1 | 10/2001 | Teveler et al. |
| 2001/0034676 A1 | 10/2001 | Vasic |
| 2001/0042785 A1 | 11/2001 | Walker et al. |
| 2002/0002075 A1 | 1/2002 | Rowe |
| 2002/0032612 A1 | 3/2002 | Williams et al. |
| 2002/0038285 A1 | 3/2002 | Golden et al. |
| 2002/0042744 A1 | 4/2002 | Kohl |
| 2002/0055904 A1 | 5/2002 | Mon |
| 2002/0055909 A1 | 5/2002 | Fung et al. |
| 2002/0077971 A1 | 6/2002 | Allred |
| 2002/0107797 A1 | 8/2002 | Combaluzier |
| 2002/0111886 A1 | 8/2002 | Chenevich et al. |
| 2002/0138415 A1 | 9/2002 | Siska |
| 2002/0152161 A1 | 10/2002 | Aoike |
| 2002/0194122 A1 | 12/2002 | Knox et al. |
| 2002/0194124 A1 | 12/2002 | Hobbs et al. |
| 2003/0001005 A1 | 1/2003 | Risafi et al. |
| 2003/0004997 A1 | 1/2003 | Parker et al. |
| 2003/0055782 A1 | 3/2003 | Slater |
| 2003/0061170 A1 | 3/2003 | Uzo |
| 2003/0074311 A1* | 4/2003 | Saylors et al. ................ 705/39 |
| 2003/0097331 A1 | 5/2003 | Cohen |
| 2003/0135459 A1* | 7/2003 | Abelman et al. ................ 705/40 |
| 2003/0144935 A1 | 7/2003 | Sobek |
| 2003/0158811 A1 | 8/2003 | Sanders et al. |
| 2003/0167225 A1 | 9/2003 | Adams |
| 2003/0191702 A1 | 10/2003 | Hurley |
| 2003/0191714 A1 | 10/2003 | Norris |
| 2003/0197059 A1 | 10/2003 | Tidball et al. |
| 2003/0200118 A1 | 10/2003 | Lee et al. |
| 2003/0208443 A1 | 11/2003 | Mersky |
| 2003/0217003 A1 | 11/2003 | Weinflash et al. |
| 2004/0036215 A1 | 2/2004 | Butler |
| 2004/0047459 A1 | 3/2004 | Diaz |
| 2004/0098351 A1 | 5/2004 | Duke |
| 2004/0111370 A1 | 6/2004 | Saylors et al. |
| 2004/0117250 A1 | 6/2004 | Lubow et al. |
| 2004/0117302 A1 | 6/2004 | Weichert et al. |
| 2004/0133515 A1 | 7/2004 | McCoy et al. |
| 2004/0143527 A1 | 7/2004 | Benkert et al. |
| 2004/0148252 A1 | 7/2004 | Fleishman |
| 2004/0153407 A1 | 8/2004 | Clubb et al. |
| 2004/0199463 A1 | 10/2004 | Deggendorf |
| 2004/0210484 A1 | 10/2004 | Lee |
| 2004/0211830 A1 | 10/2004 | Algiene |
| 2004/0215554 A1 | 10/2004 | Kemper et al. |
| 2004/0225545 A1 | 11/2004 | Turner et al. |
| 2004/0230523 A1 | 11/2004 | Johnson |
| 2004/0235542 A1 | 11/2004 | Stronach et al. |
| 2004/0236646 A1 | 11/2004 | Wu et al. |
| 2005/0004839 A1 | 1/2005 | Bakker et al. |
| 2005/0015332 A1 | 1/2005 | Chen |
| 2005/0021363 A1 | 1/2005 | Stimson et al. |
| 2005/0071230 A1 | 3/2005 | Mankoff |
| 2005/0075939 A1 | 4/2005 | Bao et al. |
| 2005/0082364 A1 | 4/2005 | Alvarez et al. |
| 2005/0108121 A1 | 5/2005 | Gravett et al. |
| 2005/0167481 A1 | 8/2005 | Hansen et al. |
| 2005/0167487 A1 | 8/2005 | Conlon et al. |
| 2005/0173520 A1 | 8/2005 | Jaros et al. |
| 2005/0177489 A1 | 8/2005 | Neff et al. |
| 2005/0177502 A1 | 8/2005 | Thomas |
| 2005/0203837 A1 | 9/2005 | Leigh et al. |
| 2005/0205663 A1 | 9/2005 | Allgiene |
| 2005/0228724 A1 | 10/2005 | Frangiosa |
| 2005/0278188 A1 | 12/2005 | Thomson et al. |
| 2005/0278347 A1 | 12/2005 | Wolf et al. |
| 2005/0283436 A1 | 12/2005 | Greer et al. |
| 2005/0289044 A1 | 12/2005 | Breslin et al. |
| 2006/0059085 A1 | 3/2006 | Tucker |
| 2006/0085269 A1 | 4/2006 | Guilfoyle |
| 2006/0085334 A1 | 4/2006 | Murphy |
| 2006/0149665 A1 | 7/2006 | Weksler |
| 2006/0149670 A1 | 7/2006 | Nguyen et al. |
| 2006/0161499 A1 | 7/2006 | Rich et al. |
| 2006/0169784 A1 | 8/2006 | Collins et al. |
| 2006/0190322 A1 | 8/2006 | Oehlerking et al. |
| 2006/0206402 A1 | 9/2006 | Sullivan |
| 2006/0212392 A1 | 9/2006 | Brown |
| 2006/0212393 A1 | 9/2006 | Lindsay Brown |
| 2006/0224502 A1 | 10/2006 | McGowan |
| 2006/0249570 A1 | 11/2006 | Seifert et al. |
| 2006/0249870 A1 | 11/2006 | Tachauer |
| 2006/0259364 A1 | 11/2006 | Strock et al. |
| 2006/0259957 A1 | 11/2006 | Tam et al. |
| 2006/0282356 A1 | 12/2006 | Andres et al. |
| 2006/0282374 A1 | 12/2006 | Stone |
| 2006/0293966 A1 | 12/2006 | Inouye |
| 2007/0000997 A1 | 1/2007 | Lambert et al. |
| 2007/0011089 A1 | 1/2007 | DeSchryver |
| 2007/0038515 A1 | 2/2007 | Postrel |
| 2007/0038924 A1 | 2/2007 | Beyer et al. |
| 2007/0045401 A1 | 3/2007 | Sturm |
| 2007/0061206 A1 | 3/2007 | LeFebvre |
| 2007/0083462 A1 | 4/2007 | Cubillo et al. |
| 2007/0087819 A1 | 4/2007 | Van Luchene et al. |
| 2007/0090183 A1 | 4/2007 | Hursta et al. |
| 2007/0100745 A1 | 5/2007 | Keiser |
| 2007/0100746 A1 | 5/2007 | Blair et al. |
| 2007/0106603 A1 | 5/2007 | Whyte et al. |
| 2007/0136194 A1 | 6/2007 | Sloan |
| 2007/0152038 A1 | 7/2007 | Ciancio et al. |
| 2007/0168265 A1 | 7/2007 | Rosenberger |
| 2007/0174189 A1 | 7/2007 | Bishop et al. |
| 2007/0175982 A1 | 8/2007 | Bonalle et al. |
| 2007/0175984 A1 | 8/2007 | Khandaker et al. |
| 2007/0198352 A1 | 8/2007 | Kannegiesser |
| 2007/0198354 A1 | 8/2007 | Senghore et al. |
| 2007/0198403 A1 | 8/2007 | Aloni et al. |
| 2007/0233596 A1 | 10/2007 | Ambrose |
| 2007/0244778 A1 | 10/2007 | Bailard |
| 2007/0250380 A1 | 10/2007 | Mankoff |
| 2007/0260536 A1 | 11/2007 | Stone |
| 2007/0262140 A1 | 11/2007 | Long, Sr. |
| 2007/0265957 A1 | 11/2007 | Advani et al. |
| 2007/0265960 A1 | 11/2007 | Advani et al. |
| 2007/0267479 A1 | 11/2007 | Nix et al. |
| 2007/0271178 A1 | 11/2007 | Davis et al. |
| 2007/0276736 A1 | 11/2007 | Guilfoyle |
| 2007/0282740 A1 | 12/2007 | Wendt |
| 2008/0005001 A1 | 1/2008 | Davis et al. |
| 2008/0021772 A1 | 1/2008 | Aloni et al. |
| 2008/0040261 A1 | 2/2008 | Nix et al. |
| 2008/0040265 A1 | 2/2008 | Rackley, III et al. |
| 2008/0052189 A1 | 2/2008 | Walker et al. |
| 2008/0052224 A1 | 2/2008 | Parker |
| 2008/0059363 A1 | 3/2008 | Hotz et al. |
| 2008/0065532 A1 | 3/2008 | De La Motte |
| 2008/0091519 A1 | 4/2008 | Foss |
| 2008/0103968 A1 | 5/2008 | Bies et al. |
| 2008/0103970 A1 | 5/2008 | Books et al. |
| 2008/0120129 A1 | 5/2008 | Seubert et al. |
| 2008/0140561 A1 | 6/2008 | Neel |
| 2008/0140568 A1 | 6/2008 | Henry |

(56) References Cited

U.S. PATENT DOCUMENTS

| | | |
|---|---|---|
| 2008/0162271 A1 | 7/2008 | Benjamin |
| 2008/0162337 A1 | 7/2008 | Greenland et al. |
| 2008/0210753 A1 | 9/2008 | Plozay et al. |
| 2008/0228643 A1 | 9/2008 | Hall |
| 2008/0235095 A1 | 9/2008 | Oles et al. |
| 2008/0270298 A1 | 10/2008 | McElroy et al. |
| 2008/0281734 A1 | 11/2008 | Longe et al. |
| 2008/0294977 A1 | 11/2008 | Friedman et al. |
| 2008/0301162 A1 | 12/2008 | Wall et al. |
| 2009/0006203 A1 | 1/2009 | Fordyce, III et al. |
| 2009/0048963 A1 | 2/2009 | Bishop et al. |
| 2009/0061929 A1 | 3/2009 | Evans |
| 2009/0063297 A1 | 3/2009 | Dooley et al. |
| 2009/0063342 A1 | 3/2009 | Beckers |
| 2009/0063351 A1 | 3/2009 | Schmeyer et al. |
| 2009/0078757 A1 | 3/2009 | Hanson et al. |
| 2009/0157220 A1 | 6/2009 | Walker et al. |
| 2009/0164351 A1 | 6/2009 | Sorbe et al. |
| 2009/0164362 A1 | 6/2009 | Moore |
| 2009/0164363 A1 | 6/2009 | Ahlers |
| 2009/0171775 A1 | 7/2009 | Cashion et al. |
| 2009/0192934 A1 | 7/2009 | Chu et al. |
| 2009/0222367 A1 | 9/2009 | Jenkins et al. |
| 2009/0228307 A1 | 9/2009 | Sorbe |
| 2009/0254431 A1 | 10/2009 | Crowe et al. |
| 2010/0030687 A1 | 2/2010 | Panthaki et al. |
| 2010/0057554 A1 | 3/2010 | Lanford |
| 2010/0057609 A1 | 3/2010 | Sibson |
| 2010/0076836 A1 | 3/2010 | Giordano et al. |
| 2010/0076875 A1 | 3/2010 | Ernst et al. |
| 2010/0106555 A1 | 4/2010 | Mneimneh et al. |
| 2010/0222132 A1 | 9/2010 | Sanford et al. |
| 2010/0280949 A1 | 11/2010 | Van Rensburg |
| 2010/0306104 A1 | 12/2010 | Johnson |
| 2010/0312684 A1 | 12/2010 | Kemper et al. |
| 2011/0047039 A1 | 2/2011 | Crames et al. |
| 2011/0093323 A1 | 4/2011 | Prus et al. |
| 2011/0106698 A1 | 5/2011 | Isaacson et al. |
| 2011/0112957 A1 | 5/2011 | Ingram et al. |
| 2011/0270664 A1 | 11/2011 | Jones |
| 2013/0124429 A1 | 5/2013 | Zou et al. |

FOREIGN PATENT DOCUMENTS

| | | |
|---|---|---|
| EP | 0348932 A2 | 5/1995 |
| JP | 2-238593 A | 9/1990 |
| JP | 2-278495 A | 11/1990 |
| JP | 3-100791 A | 4/1991 |
| JP | 4-165588 A | 6/1992 |
| KR | 2010010217 | 2/2010 |
| WO | WO 86/02757 A1 | 5/1986 |
| WO | WO 86/07647 A1 | 12/1986 |
| WO | WO 88/03297 A1 | 5/1988 |
| WO | WO 89/08899 A1 | 9/1989 |
| WO | WO 91/09370 A1 | 6/1991 |
| WO | WO 93/09515 A1 | 5/1993 |
| WO | WO 94/10649 A1 | 5/1994 |
| WO | WO 94/28498 A1 | 12/1994 |
| WO | WO 95/03570 A2 | 2/1995 |
| WO | WO 97/46986 A1 | 12/1997 |
| WO | WO0060487 | 10/2000 |
| WO | WO 2007133315 A2 | 11/2007 |
| WO | 2008102329 A2 | 8/2008 |
| ZA | 200709282 | 10/2007 |

OTHER PUBLICATIONS

United Nations Conference on Trade and Development, E-finance and Small and Medium-Size Enterprises (SMEs) in Developing and Transition Economies, UNCTAD Expert Meeting, Oct. 17, 2001.

Tim Jones, Paradigms lost, RSA Journal, Oct. 2006, pp. 28-31.

Diego Rumiany, Internet Bidding for Microcredit: making it work in the developed world, conceiving it for the developing world, Mar. 2007.

Stefan Heng, Thomas Meyer, and Antje Stobbe, Implications of Web 2.0 for financial institutions: Be a driver, not a passenger, Munich Personal RePEc Archive, Jul. 31, 2007.

Matt Flannery, Kiva and the Birth of Person to Person Microfinance, Innovations, pp. 31-56, Winter & Spring 2007.

Michael K Hulme and Collette Wright, Internet Based Social Lending: Past, Present and Future, Social Futures Observatory, Oct. 2006.

Richard W. Coleman, Is the Future of the Microfinance Movement to be Found on the Internet?, International Trade and Finance Association Working Papers 2007.

Amanda Scott and Patrick Towell, The web we weave, Financial World, pp. 12-15, Nov. 2006.

Prosper, Access and Transparency through Person-to-Person Lending, FDIC Advisory Committee on Economic Inclusion, Mar. 28, 2007.

Co-pending U.S. Appl. No. 12/338,365, filed Dec. 18, 2008, titled "Transfer Account Systems, Computer Program Products, and Associated Computer-Implemented Methods".

Co-pending U.S. Appl. No. 12/338,402, filed Dec. 18, 1008, titled "Transfer Account Systems, Computer Program Products, and Associated Computer-Implemented Methods".

Co-pending U.S. Appl. No. 12/338,440, filed Dec. 18, 2008, titled "Transfer Account Systems, Computer Program Products, and Associated Computer-Implemented Methods".

Co-pending U.S. Appl. No. 12/338,712, filed Dec. 18, 2008, titled "Computer-Implemented Methods, Program Product, and System to Enhance Banking Terms Over Time".

Co-pending U.S. Appl. No. 12/338,684, filed Dec. 18, 2008, titled "Transfer Account Systems, Computer Program Products, and Associated Methods".

Co-pending U.S. Appl. No. 12/338,497, filed Dec. 18, 2008, titled "Private Label Promotion Card System, Program Product, and Associated Computer-Implemented Methods".

Co-pending U.S. Appl. No. 12/338,540, filed Dec. 18, 2008, titled "Private Label Promotion Card System, Program Product, and Associated Computer-Implemented Methods".

Co-pending U.S. Appl. No. 12/338,645, filed Dec. 18, 2008, titled "Transfer Account Systems, Computer Program Products, and Methods to Prioritize Payments from Preselected Bank Accounts".

Co-pending U.S. Appl. No. 12/607,780, filed Oct. 28, 2009, titled Shopping Center Gift Card Offer Fulfillment Machine, Program Product, and Associated Methods.

Co-pending U.S. Appl. No. 12/609,896, filed Oct. 30, 2009, titled Machine Methods, and Program Product for Electronic Order Entry.

Co-pending U.S. Appl. No. 12/626,349, filed Nov. 25, 2009, titled Machine, Methods, and Program Product for Electronic Inventory Tracking.

International Search Report for PCT/US09/56072 dated Oct. 20, 2009.

Bank Deals—Best Rates and Deals: EverBank's World Currency CDs—My Interview with EverBank's Executive Frank Trotter, http://bankdeals.blogspot.com, Jul. 29, 2007.

Foreign Exchange Market, http://en.wikipedia.org.

Avoid Gift Card Pitfalls, ConsumerReports.org.

VIPGift Receives Investment From Summit Partners and Bridgescale Partners, Nov. 11, 2008, Chattanooga, TN and Palo Alto, CA.

Co-pending U.S. Appl. No. 12/562,331, filed Sep. 18, 2009, titled Computerized Extension of Credit to Exisiting Demand Deposit Accounts, Prepaid Cards and Lines of Credit Based on Expected Tax Refund Proceeds, Associated Systems and Computer Program Products.

International Search Report from co-pending PCT Application No. PCT/US2009/034692 filed Feb. 20, 2009 titled "Methods to Advance Loan Proceeds on Prepaid Cards, Associated Systems and Computer Program Products".

Co-pending U.S. Appl. No. 12/397,113, filed Mar. 3, 2009, titled "Person-to-Person Lending Program Product, System, and Associated Computer-Implemented Methods".

Co-pending U.S. Appl. No. 12/389,749, filed Feb. 20, 2009, titled "Methods to Advance Loan Proceeds on Prepaid Cards, Associated Systems and Computer Program Products".

(56) References Cited

OTHER PUBLICATIONS

Co-pending U.S. Appl. No. 12/417,199, filed Apr. 2, 2009, titled "System, Program Product, and Associated Methods to Autodraw for Micro-Credit Attached to a Prepaid Card".
Co-pending U.S. Appl. No. 12/417,211, filed Apr. 2, 2009, titled "System, Program Product, and Associated Methods to Autodraw for Micro-Credit Attached to a Prepaid Card".
Co-pending U.S. Appl. No. 12/417,182, filed Apr. 2, 2009, titled "System, Program Product, and Method to Authorize Draw for Retailer Optimization".
Co-pending U.S. Appl. No. 12/407,320, filed Mar. 19, 2009, titled "Computerized Extension of Credit to Existing Demand Deposit Accounts, Preparid Cards and Lines of Credit Based on Expected Tax Refund Proceeds, Associated Systems and Computer Program Products".
Co-pending U.S. Appl. No. 12/417,162, filed Apr. 2, 2009, titled "System, Program Product, and Method for Debit Card and Checking Account Autodraw".
Co-pending U.S. Appl. No. 12/367,187, filed Feb. 6, 2009, titled "Government Targeted-Spending Stimulus Card System, Program Product and Computer-Implemented Methods".
Co-pending U.S. Appl. No. 12/465,277, filed May 13, 2009, titled "System, Program Product, and Computer-Implemented Method for Loading a Loan on a Pre-Paid Card".
Co-pending U.S. Appl. No. 12/465,306, filed May 13, 2009, titled "System, Program Product, and Computer-Implemented Method for Loading a Loan on an Existing Pre-Paid Card".
Co-pending U.S. Appl. No. 12/465,803, filed May 13, 2009, titled "System, Program Product, and Method for Loading a Loan on a Pre-Paid Card".
International Search Report for PCT/US2009/039495 dated May 18, 2009.
International Search Report for PCT/US2008/087689 dated Jun. 17, 2009.
International Search Report for PCT/US2009/043988 dated Jul. 14, 2009.
International Search Report for PCT/US2009/039492 dated May 14, 2009.
International Search Report dated May 27, 2009 for PCT/US2009/039504 filed Apr. 3, 2009.
International Search Report dated Jun. 8, 2009 for PCT/US2009/039512 filed Apr. 3, 2009.
International Search Report dated Jun. 30, 2009 for PCT/US2009/043978 filed May 14, 2009.
Office Action dated Jul. 9, 2010 for U.S. Appl. No. 12/338,365.
Office Action dated Jul. 9, 2010 for U.S. Appl. No. 12/338,645.
Co-pending U.S. Appl. No. 12/554,659, filed Sep. 4, 2009, titled "System, Method, and Program Product for Foreign Currency Travel Account".
Co-pending U.S. Appl. No. 12/554,432, filed Sep. 4, 2009, titled "System, Program Product and Methods for Retail Activation and Reload Associated with Partial Authorization Transactions".
Cross, Sam Y., All About . . . the Foreign Exchange Market in the United States, 1998, Federal Reserve Bank of New York.
Office Action dated Sep. 28, 2010 for co-pending U.S. Appl. No. 12/338,402, filed Dec. 18, 2008.
Office Action dated Sep. 3, 2010 for co-pending U.S. Appl. No. 12/417,162, filed Apr. 2, 2009.
Co-pending U.S. Appl. No. 12/562,331, filed Sep. 18, 2009, titled Computerized Extension of Credit to Existing Demand Deposit Accounts, Prepaid Cards and Lines of Credit Based on Expected Tax Refund Proceeds, Associated Systems and Computer Program Products.
Co-pending U.S. Appl. No. 12/700,681, filed Feb. 4, 2010, titled System and Computer Program Product to Issue a Retail Prepaid Card Including a User-Designed External Face Using a Chit and Related Computer Implemented Methods.
Co-pending U.S. Appl. No. 12/814,405, filed Jun. 11, 2010, titled Environmental-Friendly Fuel Credit Card System, Program Product, and Computer-Implemented Methods.

Co-pending U.S. Appl. No. 12/877,490, filed Sep. 8, 2010, titled System, Program Product, and Method for Debit Card and Checking Account Autodraw.
Co-pending U.S. Appl. No. 12/877,524, filed Sep. 8, 2010, titled System, Program Product, and Method for Debit Card and Checking Account Autodraw.
Co-pending U.S. Appl. No. 12/889,281, filed Sep. 23, 2010, titled Computer-Implemented Methods, Computer Program Products, and Systems for Enhanced Loan Product Repayments.
Co-pending U.S. Appl. No. 12/892,847, filed Sep. 28, 2010, titled Computer-Implemented Methods, Computer Program Products, and Systems for Management and Control of a Loyalty Rewards Network.
Co-pending U.S. Appl. No. 12/731,852, filed Mar. 25, 2010, titled Machine, Program Product, and Computer Implemented Methods for Confirming a Mobile Banking Request.
Co-pending U.S. Appl. No. 13/036,076, filed Feb. 28, 2011, titled Machine, Program Product, and Computer Implemented Method to Construct a Person-To-Person Loan.
Office Action dated Feb. 18, 2011, in co-pending U.S. Appl. No. 12/338,402.
Office Action Dated Mar. 4, 2011, in co-pending U.S. Appl. No. 12/338,684.
Office Action dated Mar. 17, 2010, in co-pending U.S. Appl. No. 12/417,199.
Office Action dated Mar. 17, 2011, in co-pending U.S. Appl. No. 12/465,803.
Office Action dated Mar. 29, 2011, in co-pending U.S. Appl. No. 12/417,211.
Office Action dated Mar. 29, 2011, in co-pending U.S. Appl. No. 12/407,320.
Office action from co-pending U.S. Appl. No. 12/338,497 dated Aug. 18, 2011.
Notice of Allowance for co-pending U.S. Appl. No. 12/417,199 dated Aug. 18, 2011.
Notice of Allowance for co-pending U.S. Appl. No. 12/417,211 dated Aug. 22, 2011.
Wolfe, Daniel, "An E-Variation on Payday Loan Theme", American Banker, Jul. 28, 2005.
"Letter of Credit Explained: What is Letter of Credit?", Dec. 26, 2005, pp. 1-2 (cited in Office Action from co-pending U.S. Appl. No. 12/338,540 dated Sep. 1, 2011).
Office Action from co-pending U.S. Appl. No. 12/338,540 dated Sep. 1, 2011.
Notice of Allowance of co-pending U.S. Appl. No. 12/338,365 dated Sep. 1, 2011.
Orszag, Peter, "Unemployment Insurance as an Economic Stimulus", Center for Budget and Policy Priorities, Nov. 15, 2011.
Powell, Robert L., "Statewide Electronic Commerce Program Status Report", State of North Carolina Office of the State Controller, Mar. 7, 2007.
Parrott, James, "Jittery Wall Street, Calm City?", Gotham Gazette, Apr. 16, 2007.
Zandi, Mark, "Washington Throws the Economy a Rope", Moody's Economy.com, Jan. 22, 2008.
Blair, Christine E., et al., "Challenges to the Dual Banking System: The Funding of Bank Supervision", FDIC Bank Review, Mar. 31, 2006.
Office Action for co-pending U.S. Appl. No. 12/367,187 dated Jun. 27, 2011.
"Developing Asia and the World", Asian Development Bank 2002.
Notice of Allowance in co-pending U.S. Appl. No. 12/554,659 dated Aug. 2, 2011.
Office Action in co-pending U.S. Appl. No. 12/338,712 dated Jul. 28, 2011.
Office Action in co-pending U.S. Appl. No. 12/338,440 dated Aug. 1, 2011.
Financial Advice Investment Money Oct. 1st, 2009 at 5:50pm, HSBC Offshore Internet Banking.
Financial Advice Investment Money Oct. 1st, 2009 at 7:25am, HSBC Offshore Internet Banking.
Microtrax Ltd., PC Electronic Payment Systems Reference Manual; 1995 (381 pages).

(56) References Cited

OTHER PUBLICATIONS

John P. Caskey and Gordon H. Selton, Jr.; Is the Debit Card Revolution Finally Here?; Federal Reserve Bank of Kansas City, Economic Review; Fourth Quarter 1994; pp. 70-95, vol. 79 #4 (17 pages).
Laura Castaneda; Business Promote Services to Customers Day In and Day Out; The Dallas Morning News, Nov. 26, 1994 (3 pages).
Margaret Mannix, Checkout Tech, U.S. News and World Report, Feb. 27, 1995 (6 pages).
Credit Terminals to be Used at Canadian Liquor Outlets, Card News, Jan. 23, 1995 (1 p age).
Debit Card Popularity on the Rise, Chain Store Age Executive, Jan. 1994 (1 page).
Debit Goes to Dinner, Credit Card Management, New York, Oct. 1994 (2 pages).
Alan Peppard, Down and Dirty in Deep Ellum, The Dallas Morning News, Dec. 3, 1994 (2 pages).
Everest Reference Manual, VeriFone Part No. 25399, Revision A, Manual Revision 1.0, Jul. 1995 (66 pages).
Express Cards and Trains, Chain Store Age Executive Edition, Jan. 1995 (1 page).
Suzanne Brown, Goodnight Amy, Meg, Beth and Jo, Rocky Mountain News, Dec. 8, 1994 (1 page).
Robert J. Klein, Here Comes the Debit Card, D&B Reports, Jul./Aug. 1990 (2 pages).
Hypercom S7C Advertisement, Chain Store Age, Sep. 1995 (4 pages).
Hypercom S7SC Advertisement, Chain Store Age, Feb. 1996 (2 pages).
IBM 4680-4690 Advanced Payment System for Chain Drug Sales Application User's Guide, Nov. 1996 (256 pages).
IBM 4680-4690 Advanced Payment System for Chain Drug Sales Application User's Guide, Jul. 1996 (248 pages).
IBM 4680-4690 Advanced Payment System for Supermarket Application User's Guide, Sep. 1996 (222 pages).
Fox, Linda A., Keep an Eye on Your Credit Card, The Toronto Sun, Aug. 9, 1996 (1 page).
Pyatt, Rudolph A., Jr., Mobil Stations to Permit Use of Bank Cards, The Washington Post (1 page).
NCR 4430-5000 MSR/PIN User's Guide, 1994 (265 pages).
Nieman Marcus: High-Tech for the Holidays, Adweek, Dec. 5, 1994 (1 page).
Neiman Marcus Offers Electronic Gift Certificate, Card Fax, Jan. 23, 1995 (1 page).
Neiman Marcus to Launch NM Express Automated Gift Card, PR Newswire, Nov. 22, 1994 (1 page).
NM Express Card Advertisement, The New Yorker, Dec. 12, 1994 (3 pages).
Service Mark Registration No. 1,981,044 for "NM Express Card", registered Jun. 18, 1996 (1 page).
Omni 480/490 Programmer's Guide, VeriFone Part No. 12924—Revision A, Manual Revision 1.0, Oct. 1993 (228 pages).
One Company's Diversification Shakes Up Peripherals Market, Chain Store Age, Jun. 1996 (3 pages).
O'Keefe, Michael, Portable POS Debit Terminal Mean Greater Convenience, Bank Systems & Technology, Nov. 1994 (2 pages).
POS Terminal Can Handle Direct Debits, ABA Banking Journal, Sep. 1984 (2 pages).
Racal Corp. Advertisement, POS Terminal Eliminates Credit Card Vouchers, ABA Banking Journal, Nov. 1985 (2 pages).
Szabo, Joan C., The Changing World of Financial Services, Nation's Business, Oct. 1994 (7 pages).
VeriFone Everest Advertisement, Stores, May 1995 (2 pages).
VeriFone Folio (TM) Brings Credit and Debit Card Payment to the Restaurant Table, PR Newswire, May 16, 1994 (3 pages).
David B. Barnes, VeriFone Introduces Everest (TM) Customer Activated Payment System to Multi-lane Retail Market, PR Newswire, Feb. 20, 1995 (2 pages).
VeriFone Introduces Pinpad (TM) 1000 to Point-of-Sale Debit Market, M2 Presswire, Apr. 21, 1995 (1 page).

VeriFone TCL Terminal Control Language Programmer's Manual, VeriFone Part No. 00368-01, Revision G, Manual Revision 8.0, Aug. 1992 (362 pages).
VeriFone Tranz 330 Reference Manual, Verifone Part No. 00483-Revision D, Manual Revision 3.01, Apr. 1990 (144 pages).
Microtrax Ltd. Omni 490M (and 490ML) Operation Manual for Integrated and Non-Integrated Configurations, 1994 (60 pages).
Microtrax Electronic Payment Systems: The MicroTrax Pinstripe Lane Equipment Users Guide, MicroTrax Ltd., Newport Beach, CA 1991 (54 pages).
IBM 4680-4690 Supermarket Application—Electronic Funds Transfer Feature Enhancement: User's Guide, IBM Corp., Research Triangle Park, NC, Sep. 1995 (318 pages).
IBM 4680 General Sales Application Electronic Funds Transfer User's Guide, IBM Corp., Research Triangle Park, NC, Dec. 1990 (260 pages).
IBM 4680 General Sales Application Electronic Funds Transfer Users Guide, IBM Corp., Research Triangle Park, NC, Mar. 1991 (263 pages).
IBM 4680 General Sales Application: Guide to Operations, Research Triangle Park, NC, Jun. 1991 (429 pages).
Krino, Gary, et al., A Birthday Card That Pays Off, The Orange County Register, Jul. 19, 1996 (2 pages).
Cohen, Bruce, Alternative to Cash Gains Ground, The Financial Post, Apr. 22, 1994 (2 pages).
Bank of Boulder POS Debit Solution at the Table Now in Beta: First Bank to Certify IVI Spirit C2000 on MAPP (R), Business Wire, Aug. 3, 1994 (1 page).
Office Action in co-pending U.S. Appl. No. 12/609,896 dated Apr. 5, 2011.
Office Action in co-pending U.S. Appl. No. 12/417,162 dated Apr. 13, 2011.
Wolf, File History of US 2005/0278347.
Check Cashers Move Into Cards, Accounts (Cover Story), ATM & Debit News [serial online], Apr. 20, 2006, 6(24), pp. 1-3, available from Business Source Complete, Ipswich, MA.
Mangu-Ward, K.; (Oct. 2009), Payday of Reckoning, Reason, 41(5), pp. 40-47, retrieved Jun. 15, 2012, from Research Library (Document ID:1861658171).
Wolf, Alan Steven, What to do when the Chain Breaks, Servicing Management, Feb. 1997, 3 pages.
99Bill Launches Installment Credit Services, (Aug. 21, 2008), PR Newswire, 2 pages, retrieved Jul. 9, 2012, from Business Dateline (Document ID: 1536854041).
Intralinks, Inc. Begins European Rollout of Its Proven Electronic Solution for Loan Syndication, London (Business Wire), Oct. 8, 1997, 3 pages.
Final Office Action for co-pending U.S. Appl. No. 13/232,405 dated May 22, 2012.
Office Action for co-pending U.S. Appl. No. 13/405,051 dated Jun. 6, 2012.
Final Office Action for co-pending U.S. Appl. No. 12/877,524 dated Jun. 8, 2012.
Notice of Allowance for co-pending U.S. Appl. No. 12/700,681 dated Jun. 11, 2012.
Notice of Allowance for co-pending U.S. Appl. No. 13/365,982 dated Jun. 26, 2012.
Office Action for co-pending U.S. Appl. No. 12/554,432 dated Jun. 29, 2012.
Office Action for co-pending U.S. Appl. No. 13/349,290 dated Jul. 3, 2012.
Notice of Allowance for co-pending U.S. Appl. No. 12/338,540 dated Jul. 9, 2012.
Office Action for co-pending U.S. Appl. No. 13/282,186 dated Jul. 13, 2012.
Notice of Allowance for co-pending U.S. Appl. No. 13/330,397 dated Jul. 18, 2012.
Final Office Action for co-pending U.S. Appl. No. 12/367,187 dated Jul. 19, 2012.
Final Office Action for co-pending U.S. Appl. No. 13/232,700 dated Jul. 19, 2012.
Final Office Action for co-pending U.S. Appl. No. 12/626,349 dated Jul. 20, 2012.

(56) References Cited

OTHER PUBLICATIONS

Office Action for co-pending U.S. Appl. No. 13/036,076 dated Jul. 24, 2012.
Notice of Allowance for co-pending U.S. Appl. No. 13/481,950 dated Jul. 30, 2012.
Notice of Allowance for co-pending U.S. Appl. No. 13/405,079 dated Aug. 6, 2012.
Notice of Allowance for co-pending U.S. Appl. No. 13/474,519 dated Aug. 27, 2012.
Office Action for co-pending U.S. Appl. No. 12/889,281 dated Aug. 30, 2012.
Notice of Allowance for co-pending U.S. Appl. No. 13/232,405 dated Sep. 4, 2012.
Notice of Allowance for co-pending U.S. Appl. No. 12/338,497 dated Sep. 17, 2012.
Notice of Allowance for co-pending U.S. Appl. No. 12/877,490 dated Sep. 20, 2012.
Zubko, N., "An Automotic Connection Electronic Transaction Tools Help Manufacturers Connect With Suppliers to Streamline Sourcing Efforts", Industry Week, Jul. 2008, pp. 26-27, vol. 257, No. 7.
Notice of Allowance from co-pending U.S. Appl. No. 12/609,896 dated Oct. 27, 2011.
Office Action from co-pending U.S. Appl. No. 12/562,331 dated Oct. 20, 2011.
Notice of Allowance from co-pending U.S. Appl. No. 12/407,320 dated Oct. 18, 2011.
Office Action from co-pending U.S. Appl. No. 12/626,349, dated Nov. 22, 2011.
Congressional Budget Office, "Emerging Electronic Methods for Making Payments" (Jun. 1996), CBO.
Coady et al., "Targeted anti-poverty intervention: A selected annotated bibliography" (Apr. 2002), World Bank.
Notice of Allowance from co-pending U.S. Appl. No. 12/609,896 dated Jan. 3, 2012.
Notice of Allowance from co-pending U.S. Appl. No. 13/233,268 dated Dec. 13, 2011.
Office Action from co-pending U.S. Appl. No. 12/367,187 dated Jan. 6, 2012.
Office Action from co-pending U.S. Appl. No. 12/731,852 dated Dec. 22, 2011.
Business Dateline, Q Comm Expands Calling Card Products with Best Telecom Point-of-Sale Activated Cards; All Q Comm VeriFone Merchants Can Now Deliver Durable Calling Cards (Dec. 6, 2010), Business Wire (Dec. 8, 2011).
Notice of Allowance from co-pending U.S. Appl. No. 12/465,803 dated Dec. 20, 2011.
MasterCard Electronic prepaid (Oct. 2003). The Nilson Report, (798), (Dec. 9, 2011), The Banking Source (Document ID 474833171).
Final Office Action for co-pending U.S. Appl. No. 12/889,281 dated Apr. 8, 2013.
Final Office Action for co-pending U.S. Appl. No. 12/892,847 dated Mar. 29, 2013.
Final Office Action for co-pending U.S. Appl. No. 13/036,076 dated Apr. 8, 2013.
Final Office Action for co-pending U.S. Appl. No. 13/214,126 dated Aug. 1, 2013.
Final Office Action for co-pending U.S. Appl. No. 13/349,290 dated Mar. 14, 2013.
Garriss, J., (2004), Forging an ideal Hsa, Workspan, 47(5), 18-25, Retrieved Sep. 3, 2013.
Office Action for co-pending U.S. Appl. No. 12/367,187 dated Aug. 1, 2013.
Office Action for co-pending U.S. Appl. No. 12/397,113 dated Oct. 15, 2013.
Office Action for co-pending U.S. Appl. No. 12/626,349 dated Nov. 27, 2013.
Office Action for co-pending U.S. Appl. No. 12/607,780 dated Mar. 19, 2012.
Notice of Allowance for co-pending U.S. Appl. No. 12/465,803 dated Mar. 20, 2012.
Notice of Allowance for co-pending U.S. Appl. No. 12/562,331 dated Mar. 20, 2012.
Ex-parte Quayle Action for co-pending U.S. Appl. No. 12/700,681 dated Mar. 23, 2012.
Final Office Action for co-pending U.S. Appl. No. 12/389,749 dated Mar. 29, 2012.
Final Office Action for co-pending U.S. Appl. No. 12/731,852 dated Apr. 5, 2012.
Final Office Action for co-pending U.S. Appl. No. 12/465,306 dated Apr. 11, 2012.
Notice of Allowance for co-pending U.S. Appl. No. 13/349,423 dated Apr. 13, 2012.
Office Action for co-pending U.S. Appl. No. 12/877,490 dated Apr. 18, 2012.
Office Action for co-pending U.S. Appl. No. 12/892,847 dated Apr. 30, 2012.
Final Office Action for co-pending U.S. Appl. No. 12/338,440 dated Jan. 19, 2012.
Office Action for co-pending U.S. Appl. No. 12/465,306 dated Nov. 10, 2011.
Notice of Allowance for co-pending U.S. Appl. No. 12/417,162 dated Oct. 1, 2012.
Office Action for co-pending U.S. Appl. No.. 13/214,126 dated Oct. 4, 2012.
Notice of Allowance for co-pending U.S. Appl. No. 12/607,780 dated Oct. 9, 2012.
Final Office Action for co-pending patent U.S. Appl. No. 13/232,700 dated Oct. 12, 2012.
Office Action for co-pending U.S. Appl. No. 13/284,524 dated Oct. 15, 2012.
Notice of Allowance for co-pending U.S. Appl. No. 13/601,724 dated Oct. 18, 2012.
Office Action for co-pending U.S. Appl. No. 13/536,765 dated Nov. 30, 2012.
Notice of Allowance for co-pending U.S. Appl. No. 13/282,186 dated Dec. 17, 2012.
Downes, How to avoid exchange charges Wasting Money A foreign currency bank account could be the answer, The Daily Telegraph, London (UK), Mar. 10, 2007.
Office Action for co-pending U.S. Appl. No. 13/232,405 dated Feb. 2, 2012.
Office Action for co-pending U.S. Appl. No. 12/877,524 dated Feb. 14, 2012.
Notice of Allowance for co-pending U.S. Appl. No. 12/417,182 dated Feb. 14, 2012.
Final Office Action for co-pending U.S. Appl. No. 12/338,497 dated Mar. 1, 2012.
Final Office Action for co-pending U.S. Appl. No. 12/465,277 dated Feb. 28, 2012.
Office Action in co-pending U.S. Appl. No. 12/417,182 dated Sep. 28, 2011.
Final Office Action in co-pending U.S. Appl. No. 12/338,684 dated Sep. 23, 2011.
Lazarus, David, "120% rate for Wells' Advances", Oct. 16, 2004, San Francisco Chronicle (cited in Final Office Action in co-pending U.S. Appl. No. 12/338,684 dated Sep. 23, 2011).
Office Action in co-pending U.S. Appl. No. 12/397,113 dated Sep. 30, 2011.
Notice of Allowance in co-pending U.S. Appl. No. 12/338,645 dated Oct. 3, 2011.

* cited by examiner

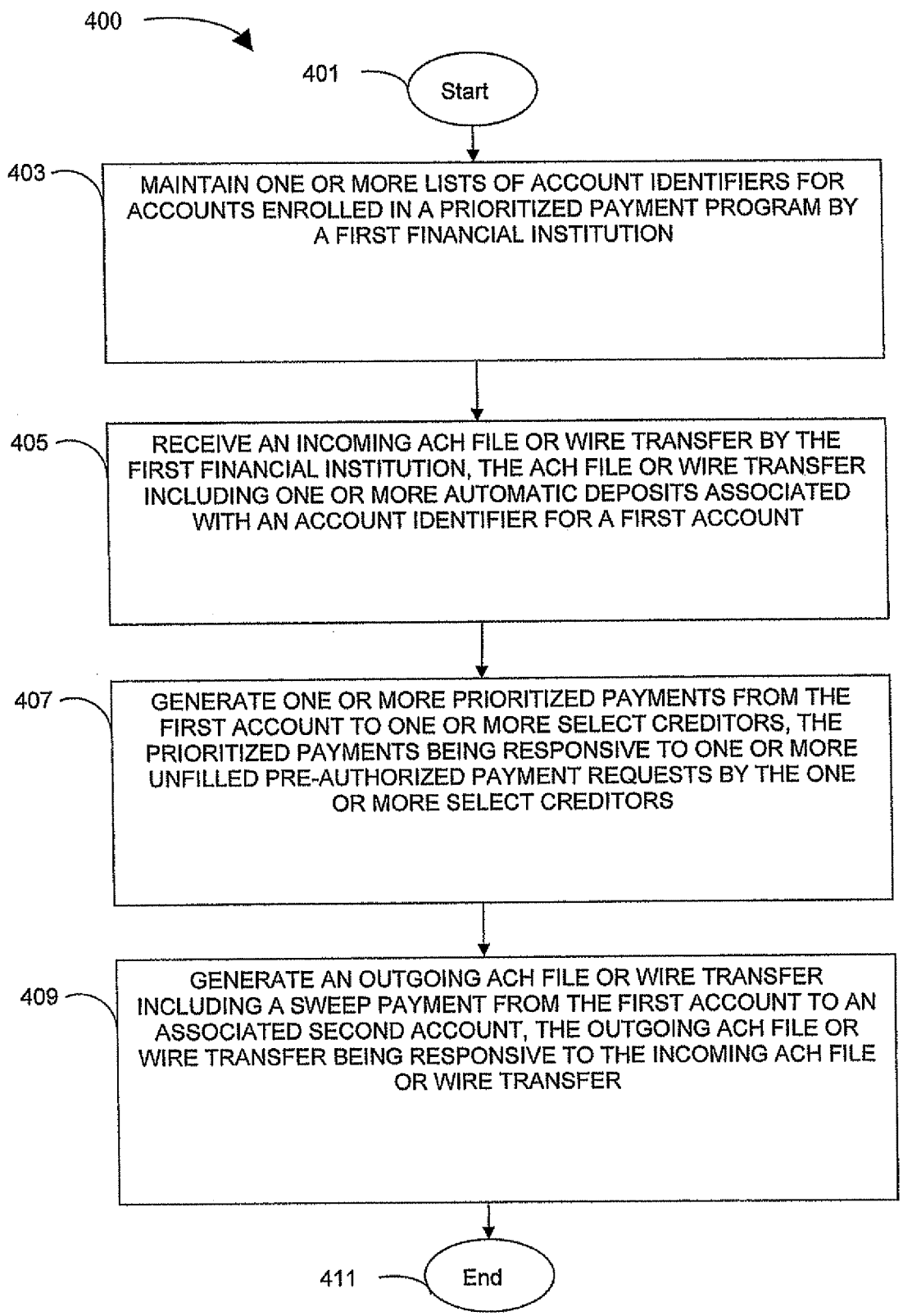

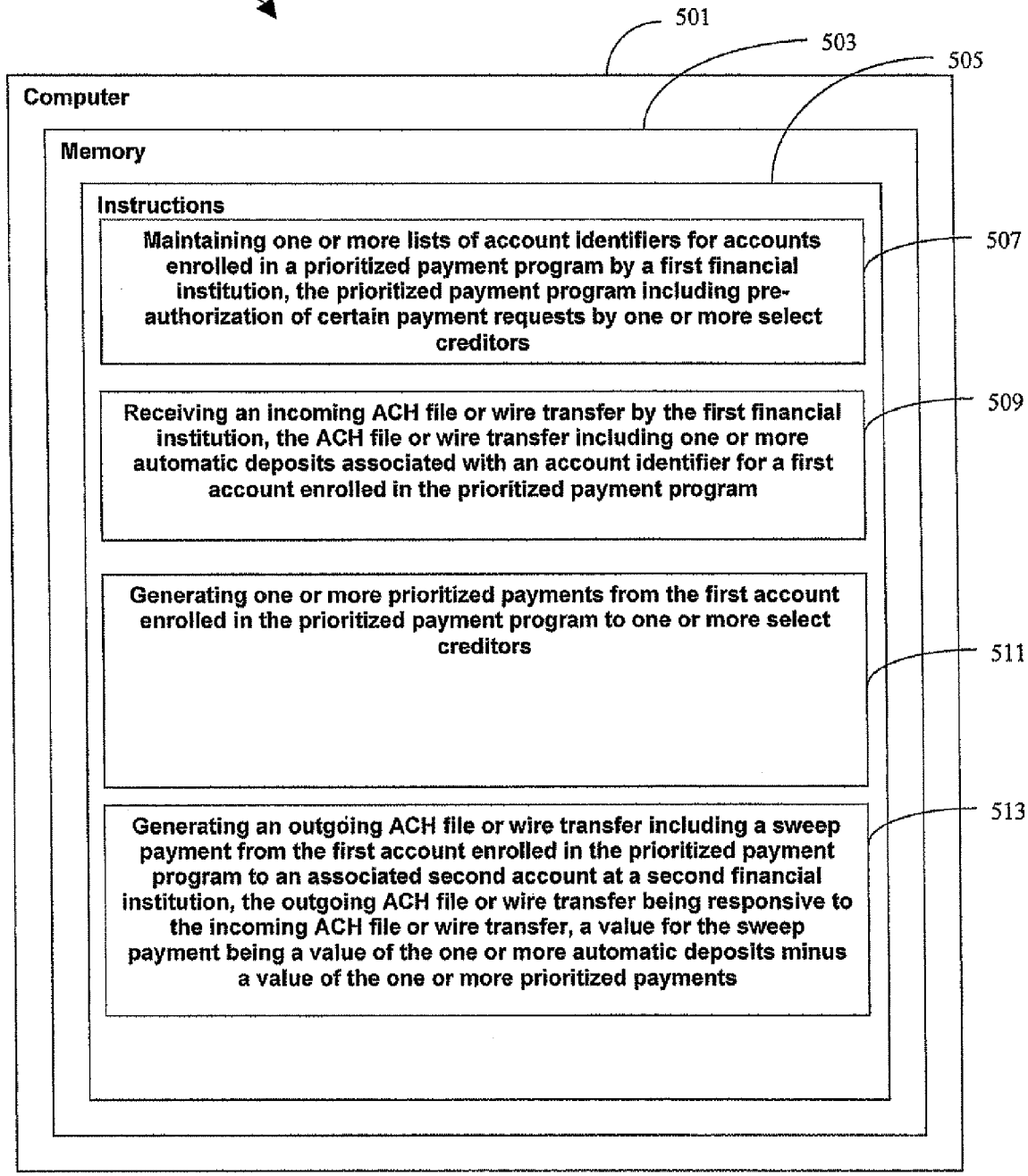

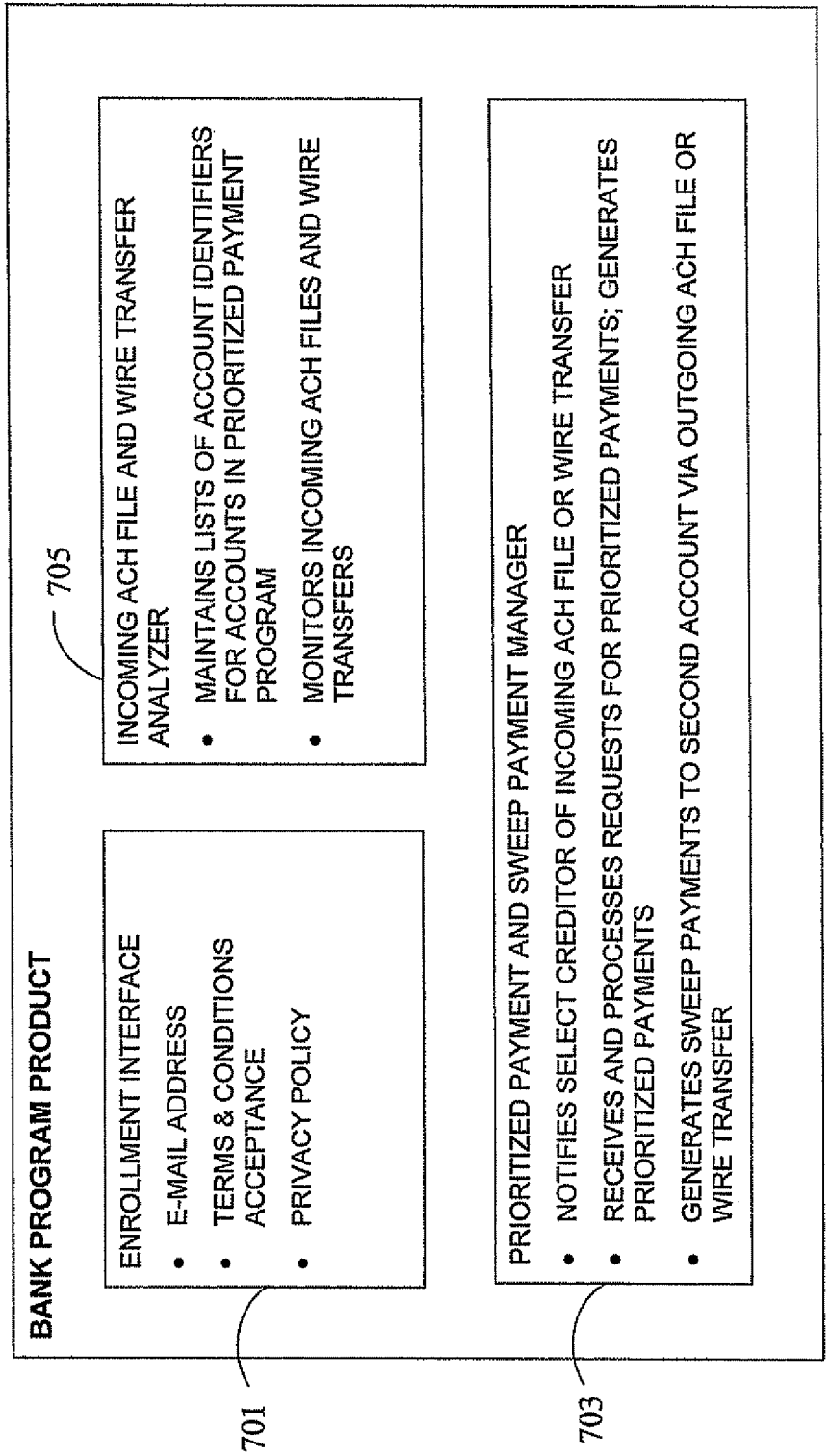

TRANSFER ACCOUNT SYSTEMS, COMPUTER PROGRAM PRODUCTS, AND COMPUTER-IMPLEMENTED METHODS TO PRIORITIZE PAYMENTS FROM PRESELECTED BANK ACCOUNT

RELATED APPLICATIONS

This application claims priority to and the benefit of U.S. Provisional Patent Application Ser. No. 61/016,213, by Sorbe et al., titled "Transfer Account Systems, Computer Program Products, and Associated Methods" filed Dec. 21, 2007, and U.S. Provisional Patent Application Ser. No. 61/052,454, by Sorbe et al., titled "Transfer Account Systems, Computer Program Products, and Methods to Prioritize Payments from Preselected Bank Account" filed May 12, 2008, and all of which are each incorporated herein by reference in their entireties. This application also relates to U.S. patent application Ser. No. 12/338,365, by Sorbe et al., titled "Transfer Account Systems, Computer Program Products, and Associated Computer-Implemented Methods" filed on the same day as this application, Dec. 18, 2008; U.S. patent application Ser. No. 12/338,402, by Sorbe et al., titled "Transfer Account Systems, Computer Program Products, and Associated Computer-Implemented Methods" filed on the same day as this application, Dec. 18, 2008; U.S. patent application Ser. No. 12/338,440, by Sorbe et al., titled "Transfer Account Systems, Computer Program Products, and Associated Computer-Implemented Methods" filed on the same day as this application, Dec. 18, 2008; and U.S. patent application Ser. No. 12/338,645, by Sorbe et al., titled "Transfer Account Systems, Computer Program Products, and Computer-Implemented Methods to Prioritize Payments from Preselected Bank Account" filed on the same day as this application, Dec. 18, 2008, each of which is incorporated herein by reference in its entirety.

BACKGROUND

1. Field of Invention

The present invention relates generally to the financial service and banking industries, and, more particularly, to systems, computer program products, and associated computer-implemented methods of providing prioritized payments from proceeds of automatic deposits.

2. Background

Today, a bank customer can authorize a loan provider to debit a customer's bank account, e.g., a checking, savings, money market, for a loan payment, or, more generally, a customer can authorize a creditor to debit the customer's bank account for a bill payment. Funds, however, may or may not be in the account at the time the creditor is authorized to debit or receive the funds. Furthermore, the bank authorized to make the debit controls the order of presentment. This allows the covering of an overdraft to the bank itself first or processing larger items early in the day in order to generate more overdraft fees when multiple smaller items are processed later in the day. Rather than bounce one big check, for example, banks may choose to bounce several smaller checks to generate extra fees.

It is known for banks to offer money management systems that have a money management account and a discretionary fund account in which bills are paid directly from the money management account on a customer-determined schedule, and excess funds beyond the customer's budget are transferred into the discretionary fund account. It is also known that such a money management system can be used in conjunction with loan payments. These offerings, however, still require the customer to determine a budget and schedule of payments.

Other systems or computer-implemented methods include having an employer make loan payments on behalf of an employee directly out of payroll. Such solutions needlessly involve the employer in the finances of the employee, which can raise privacy concerns and introduce complexity into the payroll process.

Direct deposit proceeds, as the name implies, are often directly deposited into a bank customer's deposit account, also known as a checking account, demand deposit account, savings account, or bank account. A direct deposit can be more generally known as an automatic deposit. Partially as a result of the situation with funds not being available to authorized creditors, among other reasons, many people simply do not have a traditional checking, savings, or other deposit account; they do not write checks. Instead, their automatic deposit proceeds, such as payroll and government benefits, typically are deposited into prepaid card accounts. Often these customers limit payments to available funds on a prepaid card.

SUMMARY OF INVENTION

Applicants have recognized numerous problems with current offerings for loan and other bill payments and one or more sources of these problems. For example, Applicants have recognized that it can be difficult for a creditor to be assured of payment for an authorized debit using a traditional bank account, thus exposing creditors to risk of financial loss, unless a customer is willing and able to balance or manage the deposit account, recording each and every deposit, check, Automated Teller Machine (ATM) withdraw, and debit card transaction, including automatic withdraws and bank fees. Also, from a customer's point of view, there is a need to be able to prioritize loan payments or other bill payments without having to balance a check book. That is, a customer may like, for example, to have his car payment debited from the proceeds of his payroll check immediately, rather than ever having access to the funds. There is a need for a form of financial discipline, particularly for those with tarnished credit histories. Prioritized loan and bill payment can improve the customer's payment history and, thus, improve the customer's credit rating or credit score to thereby result in lower interest rates for the customer on any future loan. From a loan provider's perspective, there is great value in being able to prioritize loan payments. By reducing the risk of non-payment, in many cases substantially so, the loan provider should be able to offer more affordable loan products, benefiting both the loan provider and also loan customers. Payment prioritization, according to embodiments of the present invention, should reduce the risk of non-payment as compared to the risk that the source of the automatically deposited funds dries up (i.e., the worker's employment is terminated) or is redirected (i.e., the worker changes the automatic deposit routing). As an additional benefit for customers, prioritized payments, according to embodiments of the present invention, expand the availability of credit and thus introduce greater competition and financial savings as many financial institutions are currently unwilling to grant credit unless a customer moves checking account to the financial institution offering credit so that the bank can preserve its "first in line on payday" status.

In view of the foregoing, Applicant provides embodiments of transfer account systems, computer program product, and associated computer-implemented methods of providing prioritized payments from the proceeds of automatic deposits according to the present invention. According to embodiments of the present invention, for example, a transfer account acts as a new form of pass-through or sweep account, allowing for the receiving of automatic deposit funds into a first account, for the generating of prioritized payments of loan or bill payments from the first account to select creditors, and for generating a sweep payment from the first account to a second account (typically a customer's existing checking account) so that the customer typically has access only to any surplus funds in the second account, that is, the automatic deposits funds net of the prioritized payments.

According to embodiments of the present invention, various situations with recurring automatic deposit funds can benefit from a transfer account, including, for example, employer payroll funds to individuals, federal or state government electronic benefits payments to individuals, and bank-initiated payments to merchants for credit card sales. Recurring automatic deposit funds also include annuities, dividends, interest payments, lottery winnings, royalty payments, and other streams of payments as understood by those skilled in the art.

According to embodiments of the present invention, various types of payment on behalf of the customer can benefit from embodiments of the present invention, including, for example: (1) payments to a third-party (i.e., credit card, utility, cell phone bills) under a license agreement from the bank providing the transfer account; (2) a customer-initiated gift card purchase; (3) customer remittance of money to family located internationally or outside of a country; (4) loan payments to the bank providing the transfer account; (5) customer-initiated bill payment; (6) customer transfer of money to another transfer account customer, and others as understood by those skilled in the art. Note that, according to embodiments of the present invention, prioritized payments may be recurring or non-recurring events.

As understood by those skilled in the art, Automated Clearing House (ACH) is the name of an electronic network for financial transactions in the United States, regulated by the Federal Reserve. Embodiments of the present invention, for example, can use standard ACH payments to receive the automatic deposit funds and to send the sweep payments to another financial institution, e.g., a second bank or a prepaid card processor. Prioritized payments can use ACH payments, wire transfers, and other forms of intrabank or interbank transfers, as understood by those skilled in the art.

Embodiments of the present invention include a computer-implemented method of providing prioritized payments. Under the computer-implemented method, a first financial institution enrolls a first account, e.g. a demand deposit account, in a prioritized payment program and associates the first account with a second account at a second financial institution. The second account can be a prepaid card account, a demand deposit account, a checking account, a savings account, a money market account, a brokerage account, or other account as understood by those skilled in the art. As part of enrolling in the prioritized payment program, the customer pre-authorizes payment requests by one or more select creditors from the first account. The first financial institution maintains one or more lists of account identifiers for accounts enrolled in the program. Next, the first financial institution receives an incoming ACH file or wire transfer as understood by those skilled in the art, including one or more automatic deposits for the first account enrolled in the prioritized payment program. After processes the incoming ACH file or wire transfer, the first financial institution then generates one or more prioritized payments from the first account to one or more select creditors responsive to the unfilled pre-authorized payment requests by the select creditors. Next the first financial institution generates an outgoing ACH file or wire transfer, responsive to the incoming ACH file or wire transfer, including a sweep payment from the first account to the associated second account at the second financial institution. The sweep payment value is the value of the one or more automatic deposits minus a value of the one or more prioritized payments, so that the customer typically has access only to any surplus funds, that is, the automatic deposits finds net of the prioritized payments.

Embodiments of the present invention further include generating fees for the first financial institution for the one or more prioritized payments from the first account enrolled in the prioritized payment program to one or more select creditors. Fees can be based per account, per transaction, per vendor, or otherwise as understood by those skilled in the art.

The embodiments of the present invention enable the offering of new products and promotions by requiring a customer to enroll in the prioritized payment program as a condition of a transaction. For example, a mobile phone provider's standard offer today, for example, can include a new phone for $100 upfront with a one-year service agreement at $75 per month. According to the embodiments of the present invention, a new offering can be a new phone for no upfront costs with one-year service agreement at $75 per month, with the agreement requiring the routing of payroll funds via automatic deposit to a transfer account and pre-authorization for the payment of the monthly bill. In this example, the mobile phone provider receives, as part of the service agreement, prioritized payment each month from the proceeds of the customer's automatic deposit. The mobile phone provider can then pass on the lower risk of loss created by the embodiments of the present invention to the customer in the form of lower fees, lower priced equipment, or both.

In other embodiments of the present invention, a customer is required to enroll in the prioritized payment program as a condition of a loan. For example, a lending institution can offer a car loan to a customer having a low credit score and without a traditional deposit account if the customer will enroll in the prioritized payment program, including pre-authorizing loan payments to the lending institution and routing the customer's payroll deposit to a transfer account.

In yet another embodiment of the present invention, a bank can offer a merchant a discounted small business loan rate if the merchant will route the automatic deposit of the merchant's credit card receipts to a transfer account and allow that bank prioritized loan payments from the credit card receipts funds.

Embodiments of the present invention include a system for providing prioritized payments from the proceeds of automatic deposits. The system includes a first computer associated with a first financial institution defining a bank computer. The bank computer is associated with an electronic communications network and positioned to receive and process an incoming ACH file or wire transfer including one or more automatic deposits associated with an account identifier for a first account enrolled in a prioritized payment program. The system also includes a second computer associated with a second financial institution. The second computer is positioned to receive an ACH file or wire transfer from the bank computer (an outgoing file from the bank computers perspective) through the electronic communications network and, responsive to the ACH file or wire transfer, to credit to an associated second account a sweep payment. The second computer can be, for example, a prepaid card processor positioned to post proceeds from an ACH file or wire transfer to a prepaid card. The sweep payment is a value of the one or more automatic deposits minus a value of one or more prioritized payments to one or more select creditors. The system also includes one or more third computers associated with one or more select creditors defining creditor computers. Each creditor computer is associated with the electronic communications network and positioned to request the one or more prioritized payments from the bank computer and to receive the one or more prioritized payments from the bank computer. The system includes a fourth computer associated with a source of automatic deposits defining a deposit computer. The deposit computer is positioned to provide information for an automatic deposit for a first account enrolled in a prioritized payment program through an electronic communications network associated with the source of automatic deposits. The system further includes a computer program product as discussed below.

Embodiments of the present invention include computer program products to implement the computer-implemented methods described and shown. Embodiments of the present invention include a computer program product, stored on a tangible computer memory media, operable on a computer, the computer program product including a set of instructions that, when executed by the computer, cause the computer to perform various operations. The operations include maintaining one or more lists of account identifiers for accounts enrolled in a prioritized payment program by a first financial institution. The prioritized payment program includes pre-authorization of certain payment requests by one or more select creditors. The operations also include receiving by the first financial institution an incoming ACH file or wire transfer, including one or more automatic deposits associated with an account identifier for a first account enrolled in the prioritized payment program. The operations further include generating one or more prioritized payments from the first account enrolled in the prioritized payment program to one or more select creditors. The prioritized payments are responsive to one or more unfilled pre-authorized payment requests by the one or more select creditors. The operations also include generating an outgoing ACH file or wire transfer including a sweep payment from the first account enrolled in the prioritized payment program to an associated second account at a second financial institution. The outgoing ACH file or wire transfer is responsive to the incoming ACH file or wire transfer, and a value for the sweep payment is a value of the one or more automatic deposits minus a value of the one or more prioritized payments.

According to an embodiment of the present invention, the operations further include notifying a select creditor that the incoming ACH file or wire transfer includes one or more accounts enrolled in the prioritized payment program prompting a payment request by the select creditor.

In addition, embodiments of the present invention include systems, computer program products, and associated computer-implemented methods of providing prioritized payments for loan, bill, and other payments from the proceeds of automatic deposits as will be understood by those skilled in the art, so that a customer has effective access through the customer account or on a prepaid card only to a net value of funds.

BRIEF DESCRIPTION OF DRAWINGS

So that the manner in which the features and benefits of the invention, as well as others which will become apparent, may be understood in more detail, a more particular description of the invention briefly summarized above may be had by reference to embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIG. 4 is a flow diagram of a computer-implemented method of providing prioritized payments from the proceeds of an automatic deposit according to an embodiment of the present invention;

FIG. 5 is a schematic diagram of a computer server having a computer program product stored in memory thereof according to an embodiment of the present invention;

FIGS. 6A and 61B are respective front and back plan views of a prepaid card according to an embodiment of the present invention;

FIG. 7 is a schematic diagram of a computer program product according to an embodiment of the present invention.

DETAILED DESCRIPTION OF INVENTION

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

One source of the problems with current offerings for loan and other bill payment, as recognized by Applicants, is that money that can be accessed is often spent. The adage about money burning a hole in the pocket is apt. Although a bank customer can authorize a loan provider to debit the customer's deposit account for a loan payment, or, more generally, a customer can authorize a creditor to debit the customer's deposit account for a bill payment, there is no guaranty that the funds will still be available at the time of the request for payment. That is, a creditor can debit the customer's account too late, or too early if new funds have not been deposited. Applicants recognize that a preferred time for a debit is concurrent with the receipt of a deposit, especially a recurring deposit such as payroll or government benefits.

Embodiments of the present invention include, for example, the use of a "transfer" account to receive proceeds from a direct deposit, to make prioritized payments to select creditors, and to make a sweep payment of surplus funds to a second account. The delay associated with the transfer account, defined as the delay from the receipt of the automatic deposit by the first account to the receipt of the sweep payment by the second account, while minimal and preferably unnoticed by the customer, provides a window of opportunity for prioritized payments without the customer accessing the finds. In some cases, receipt of the sweep payment can be the same day as the receipt of the automatic deposit by the first account. In other cases, receipt of the sweep payment can take up to two days for the proceeds to reach the second account from the receipt of the automatic deposit by the first account. Therefore, so long as the customer only accesses funds via the second account, the priority payments can be made before the customer has access to the funds from the automatic deposit.

Embodiments of the present invention, as illustrated in FIGS. 1-7, for example, provide embodiments of transfer account systems, computer program product, and associated computer-implemented methods of providing prioritized payments from the proceeds of automatic deposits according to the present invention.

Figure 1:
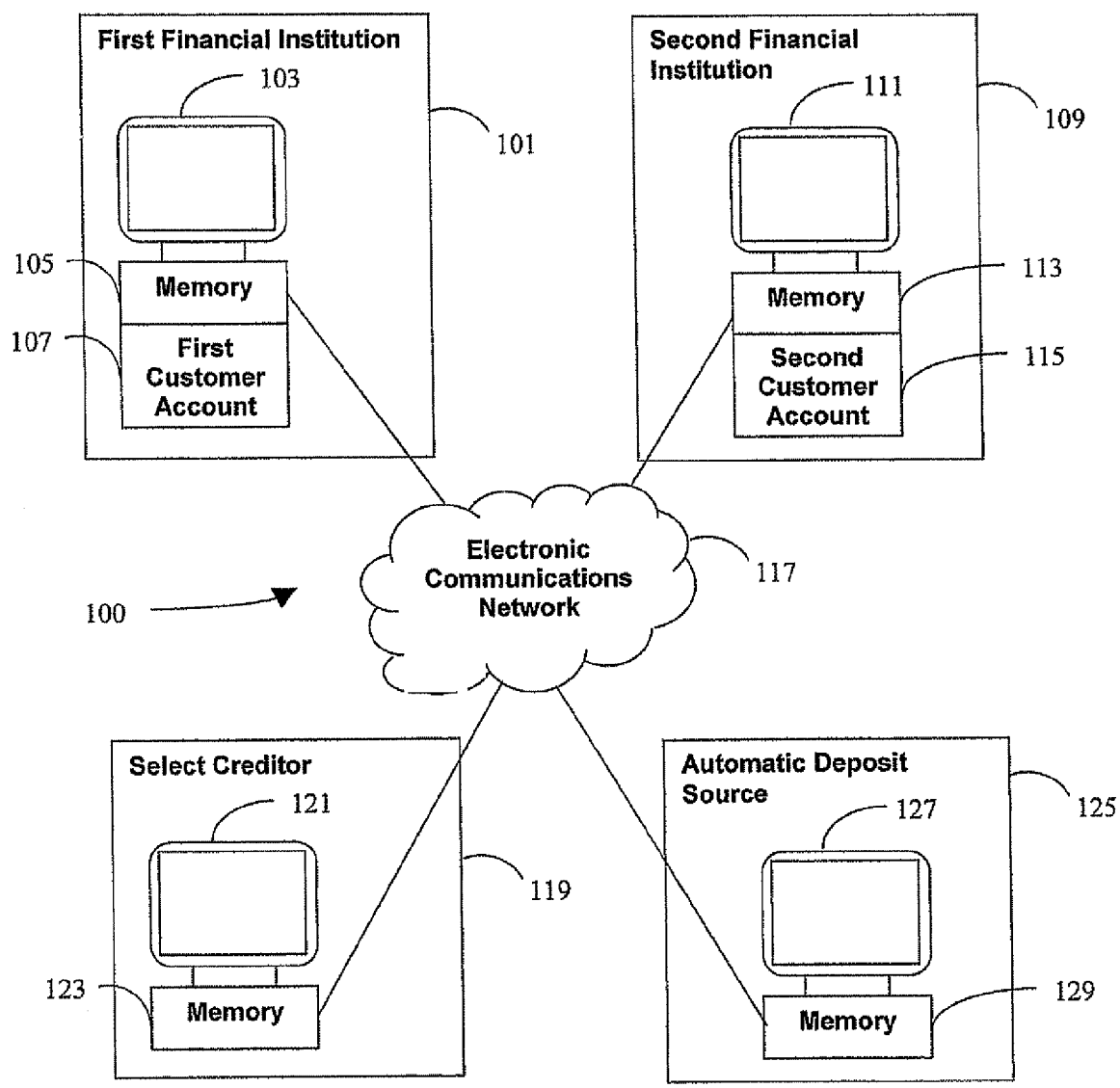
FIG. 1 is a schematic diagram of a system to provide prioritized payments from the proceeds of automatic deposits according to an embodiment of the present invention.
Figure 2:
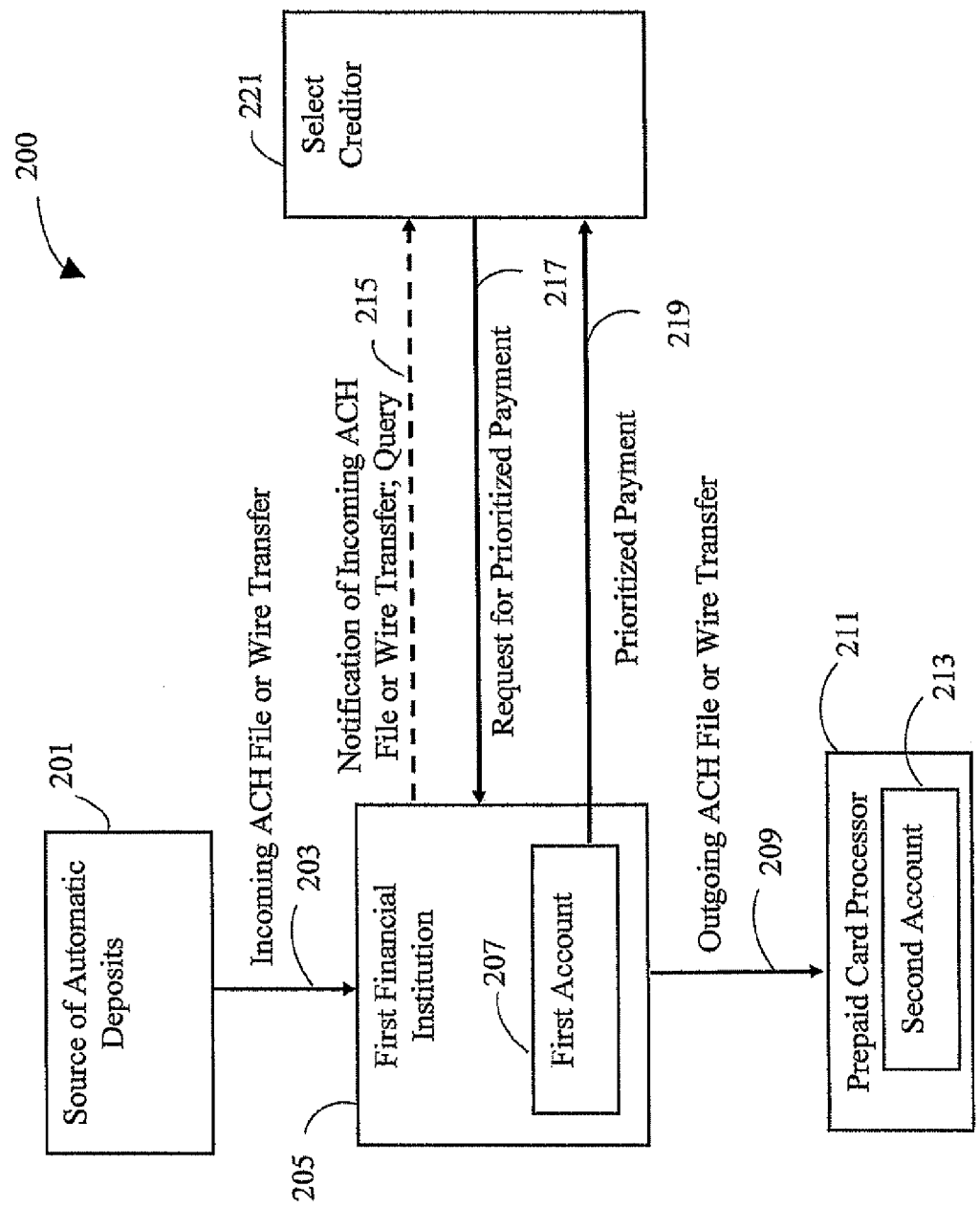
FIG. 2 is a schematic flow diagram of a system to provide prioritized payments according to another embodiment of the present invention.
Figure 3:
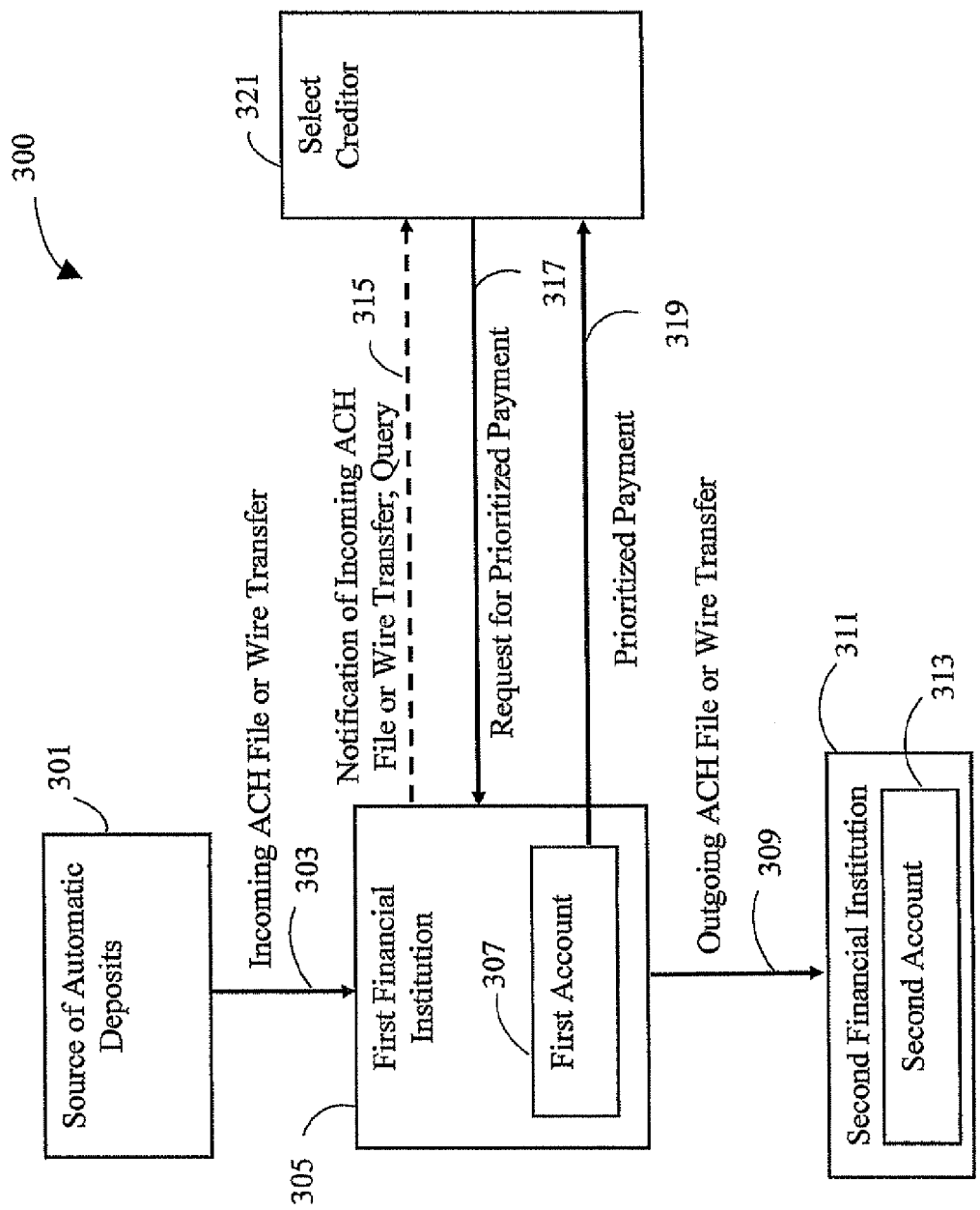
FIG. 3 is another schematic flow diagram of a system to provide prioritized payments according to an embodiment of the present invention.

Embodiments of the present invention can include, for example, as illustrated in FIGS. 1-3, a source of automatic deposits 125, 201, 301. Then a first financial institution 101, 205, 305 receives an incoming ACH file or wire transfer 203, 303 from the source of automatic deposits 125, 201, 301. The incoming ACH file or wire transfer 203, 303 includes an automatic deposit directed toward the first account 107, 207, 307. The first financial institution 101, 205, 305 can then, for example, notify a select creditor 119, 221, 321 of the incoming ACH file or wire transfer 215, 315. This query can include, for example, an account identifier for the first account 107, 207, 307. The select creditor 119, 221, 321 can, for example, request a prioritized payment 219, 319. The first financial institution 101, 205, 305 can then, for example, generate a prioritized payment 219, 319 to the select creditor 119, 221, 321. Then the first financial institution 101, 205, 305 can generate a sweep payment to a second customer account 115, 213, 313 via an outgoing ACH file or wire transfer 209, 309 to a second financial institution 109, 309. The sweep payment can be, for example, a value of the automatic deposits minus the value of the prioritized payments. Therefore, so long as the customer only accesses funds via the second account, the priority payments can be paid before the customer has access to the funds from the automatic deposit.

Figure 6A:
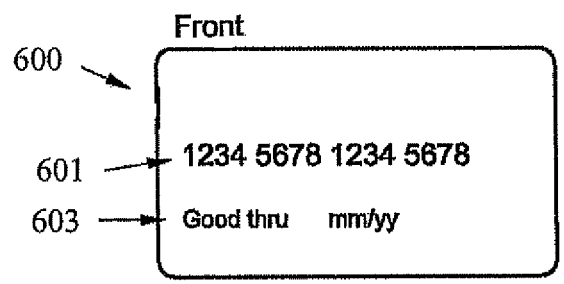
Figure 6B:
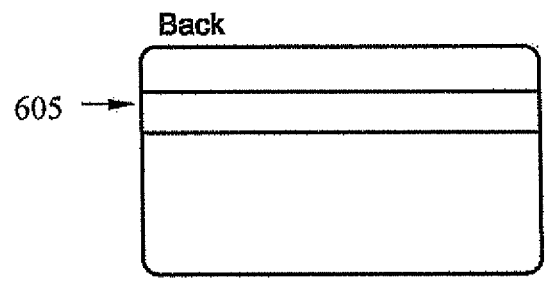

In addition, as illustrated in FIGS. 2 and 6, the second financial institution can be, for example, a prepaid card processor 211 and the second account 213 can be associated with a prepaid card. See FIGS. 6A and 6B for an example of a prepaid card 600 according to an embodiment of the present invention. Prepaid cards 600 are often associated with an account number 601. Prepaid cards 600 often have a magnetic strip 605, as understood by those skilled in the art, and are coded so that the code received by a point of sale terminal or other interface processes the code so that a prepaid or authorized value is associated with the code to thereby, for example, allow purchases with the prepaid card usage through a communications network 117, as understood by those skilled in the art, to authorize payment from a bank or other financial institution 211 and decrement the value associated with the card 600.

According to embodiments of the present invention, various sources of automatic deposits 125, 201, 301 can benefit from a transfer account, including, for example, employer payroll funds to individuals, federal or state government electronic benefits payments to individuals, and bank-initiated payments to merchants for credit card sales. Recurring automatic deposit finds also include annuities, dividends, interest payments, lottery winnings, royalty payments, and other streams of payments as understood by those skilled in the art.

According to embodiments of the present invention, various types of payment on behalf of the customer can benefit from embodiment of the present invention, including, for example: (1) payments to a third-party (i.e. credit card, utility, cell phone bills) under a license agreement from the bank providing the transfer account; (2) a customer-initiated gift card purchase; (3) a customer remittance of money to family located internationally or outside of a country where an account holder is located; (4) loan payments to the bank providing the transfer account; (5) customer-initiated bill payment; (6) a customer transfer of money to another transfer account customer, and others as understood by those skilled in the art. Note that, according to embodiments of the present invention, prioritized payments 219, 319 may be recurring or non-recurring events.

As understood by those skilled in the art, Automated Clearing House (ACH) is the name of an electronic network for financial transactions in the United States, regulated by the Federal Reserve. Embodiments of the present invention can use standard ACH payments to receive the automatic deposit funds and to send the sweep payments to another financial institution, e.g., a second bank or a prepaid card processor. An ACH file includes a record type, a transaction code, routing number, check digit, a DFI account number, the dollar amount, an individual ID, individual name, product type code, addenda indicator, and trace number, as understood by those skilled in the art. In addition, an ACH file may be a batch file, as understood by those skilled in the art. Prioritized payments can use ACH payments, wire transfers, and other forms of intrabank or interbank transfers, as understood by those skilled in the art.

Embodiments of the present invention include a computer-implemented method 400 of providing prioritized payments, as illustrated in FIG. 4. Under the computer-implemented method 400, a first financial institution enrolls a first account, e.g. a demand deposit account, in a prioritized payment program and associates the first account with a second account at a second financial institution. The second account can be a prepaid card account, a demand deposit account, a checking account, a savings account, a money market account, a brokerage account, or other account as understood by those skilled in the art. As part of enrolling in the prioritized payment program, the customer pre-authorizes payment requests by one or more select creditors from the account. The first financial institution maintains one or more lists of account identifiers for accounts enrolled in the program 403. Next, the first financial institution receives an incoming ACH file or wire transfer, including one or more automatic deposits for the first account enrolled in the prioritized payment program 405. After processes the incoming ACH file or wire transfer, the first financial institution then generates one or more prioritized payments from the first account to one or more select creditors responsive to the unfilled pre-authorized payment requests by the select creditors 407. Next the first financial institution generates an outgoing ACH file or wire transfer, responsive to the incoming ACH file or wire transfer, including a sweep payment from the first account to the associated second account at the second financial institution 409. The sweep payment value is the value of the one or more automatic deposits minus a value of the one or more prioritized payments, so that the customer typically has access only to any surplus finds, that is, the automatic deposits funds net of the prioritized payments.

Embodiments of the present invention further include generating fees for the first financial institution for the one or more prioritized payments from the first account enrolled in the prioritized payment program to one or more select creditors. Fees can be based per account, per transaction, per vendor, or otherwise as understood by those skilled in the art.

The embodiments of the present invention enable the offering of new products and promotions by requiring a customer to enroll in the prioritized payment program as a condition of a transaction. In an exemplary embodiment of the present invention, a customer is required to enroll in the prioritized payment program as a condition of a loan. For example, a lending institution can offer a car loan to a customer having a low credit score and without a traditional deposit account if the customer will enroll in the prioritized payment program, including pre-authorizing loan payments to the lending institution and routing the customer's payroll deposit to a transfer account.

Embodiments of the present invention include a system 100, as illustrated in FIG. 1, for providing prioritized payments from the proceeds of automatic deposits. The system 100 includes a first computer 103, having memory 105, associated with a first financial institution 101 defining a bank computer 103. The bank computer 103 is associated with an electronic communications network 117 and positioned to receive and process an incoming ACH file or wire transfer including one or more automatic deposits associated with an account identifier for a first account 107 enrolled in a prioritized payment program. The system also includes a second computer 111, having memory 113, associated with a second financial institution 109. The second computer 111 is positioned to receive an ACH file or wire transfer from the bank computer 103 through the electronic communications network 117 and, responsive to the ACH file or wire transfer, to credit to an associated second account 115 a sweep payment. The second computer 111 can be, for example, a prepaid card processor positioned to post proceeds from an ACH file or wire transfer to a prepaid card (see FIGS. 6A and 6B). The sweep payment is a value of the one or more automatic deposits minus a value of one or more prioritized payments to one or more select creditors. The system 100 also includes one or more third computers 121 associated with one or more select creditors 119 defining creditor computers 121. Each creditor computer 121 is associated with the electronic communications network 117 and positioned to request the one or more prioritized payments from the bank computer 103 and to receive the one or more prioritized payments from the bank computer 103. The system 100 includes a fourth computer 127, having memory 129, associated with a source of automatic deposits 125 defining a deposit computer 127. The deposit computer 127 is positioned to provide information for an automatic deposit for a first account 107 enrolled in a prioritized payment program through an electronic communications network 117 associated with the source of automatic deposits 125. The system further includes a computer program product as discussed below.

Embodiments of the present invention include a computer program product 500, as illustrated in FIG. 5, stored on a tangible computer memory media 503, operable on a computer 501, the computer program product 500 including a set of instructions 505 that, when executed by the computer, cause the computer to perform various operations. The operations include maintaining one or more lists of account identifiers for accounts enrolled in a prioritized payment program by a first financial institution 507. The prioritized payment program includes pre-authorization of certain payment requests by one or more select creditors. The operations also include receiving by the first financial institution an incoming ACH file or wire transfer, including one or more automatic deposits associated with an account identifier for a first account enrolled in the prioritized payment program 509. The operations further include generating one or more prioritized payments from the first account enrolled in the prioritized payment program to one or more select creditors 511. The prioritized payments are responsive to one or more unfilled pre-authorized payment requests by the one or more select creditors. The operations also include generating an outgoing ACH file or wire transfer including a sweep payment from the first account enrolled in the prioritized payment program to an associated second account at a second financial institution 513. The outgoing ACH file or wire transfer is responsive to the incoming ACH file or wire transfer, and a value for the sweep payment is a value of the one or more automatic deposits minus a value of the one or more prioritized payments.

According to an embodiment of the present invention, the operations can also include notifying a select creditor that the incoming ACH file or wire transfer includes one or more accounts enrolled in the prioritized payment program prompting a payment request by the select creditor 215, 315.

Embodiments of the present invention provide, for example, a program product 700 associated with a bank or other financial or lending institution implemented in modules or components, as illustrated in FIG. 7. An enrollment interface component 701 of a bank program product 700 can, for example, receive customer information, e.g., account information, contact information, including an e-mail address; receive approval of program terms, conditions, and privacy policy by the customer; and make a determination whether to accept the customer in the program as understood by those skilled in the art. In addition, an incoming ACH file and wire transfer analyzer module 705 can maintain lists of account identifiers for accounts in the prioritized payment program, can monitor incoming ACH files and wire transfers, and can perform other associated tasks as understood by those skilled in the art. A prioritized payment and sweep payment manager can, for example, notify select creditors of an incoming ACH file or wire transfer, receive and process requests for prioritized payments, generate prioritized payments responsive to an incoming ACH file or wire transfer, and generate sweep payments to a second account via an outgoing ACH file or wire transfer. Other architectures and organizations will be understood by those skilled in the art to be included within the embodiments of the present invention. Program products can be implemented in a variety of software and programming languages, including without limitation hypertext markup language ("HTML"), Java, C, C++, XML, and others as understood by those skilled in the art.

Figure 8:
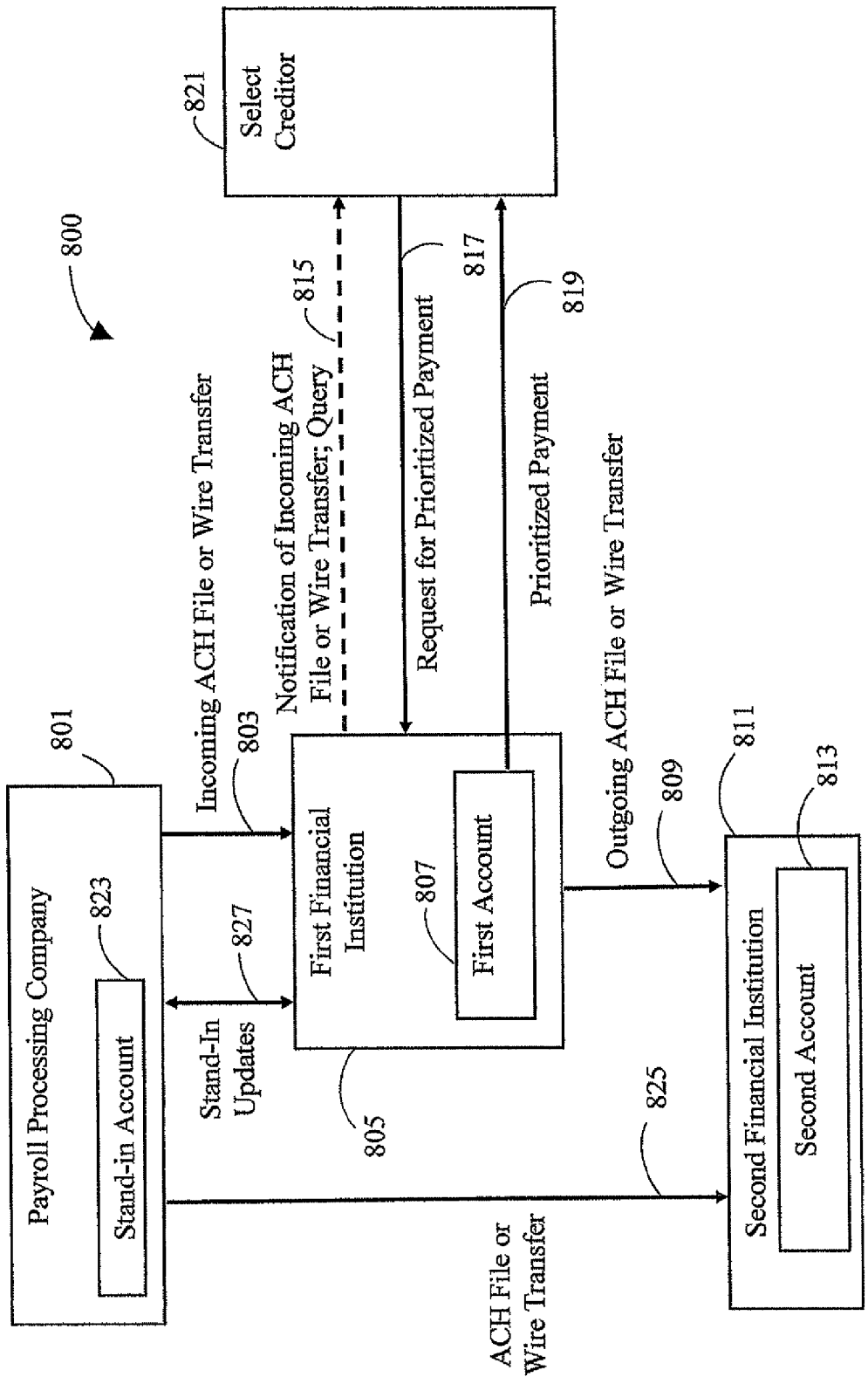
FIG. 8 is a schematic flow diagram of a system to provide prioritized payments according to an embodiment of the present invention.

Other embodiments of the present invention provide, for example, as illustrated in FIG. 8, a stand-in account 823 associated with a payroll processing company 801, or a similar entity as understood by those skilled in the art, associated with the source of the automatic deposits. A stand-in account 823 allows a customer to have transactions approved even when the primary authorization system is technically unavailable. This is achieved by one processor using data and instructions provided to it by the authorizing processor to "stand in" and approve or decline transactions on the authorizing processor's behalf if the authorizing processor system is unavailable for real-time processing. According to embodiments of the present invention, the customer can authorize a stand-in account 823 for the first account 807 at the first financial institution 805. In addition, the computer program product associated with the first financial institution 805 can further include the operation of estimating a value of one or more prioritized payments so that an estimated sweep payment can be generated from the authorized stand-in account for the first account at the first financial institution. This information is provided from the first financial institution 805 to the payroll processing company 801 as part of a series of stand-in updates 827 to synchronize the stand-in account and the first account 807. Next, the payroll processing company 801 associated with the source of the automatic deposits, or a similar entity as understood by those skilled in the art, can generate an estimated sweep payment from the stand-in account to the second account at the second financial institution 825. A value of the estimated sweep payment is a value of an automated deposit minus an estimated value of the one or more prioritized payments. One feature of the stand-in account embodiments of the present invention is to hold back an amount for the prioritized payments at an employer, a payroll processor 801, or other source of automated payments while allowing the rest of the proceeds of the automatic deposit to be accessed by the customer. Embodiments of the present inventions provide for different approaches to estimating the one or more prioritized payments for the stand-in account. An estimate of the one or more prioritized payments that errs on the large side will result in relatively smaller estimated sweep payment to the customer; whereas an estimate of the one or more prioritized payments that errs on the small side will result in a relatively larger estimated sweep payment to the customer at the risk of there being insufficient funds to cover all of the prioritized payments, as understood by those skilled in the art.

A person having ordinary skill in the art will recognize that various types of memory are readable by a computer such as described herein, e.g., deposit source computer, bank computer, credit computer, or other computers with embodiments of the present invention. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. For example, such media can include operating instructions, as well as instructions related to the system and the computer-implemented method steps described above and can operate on a computer. It will be understood by those skilled in the art that such media can be at other locations instead of or in addition to the bank to store program products, e.g., including software, thereon.

This application claims priority to and the benefit of U.S. Provisional Patent Application Ser. No. 61/016,213, by Sorbe et al., titled "Transfer Account Systems, Computer Program Products, and Associated Methods" filed Dec. 21, 2007, and U.S. Provisional Patent Application Ser. No. 61/052,454, by Sorbe et al., titled "Transfer Account Systems, Computer Program Products, and Methods to Prioritize Payments from Preselected Bank Account" filed May 12, 2008, and all of which are each incorporated herein by reference in their entireties. This application also relates to U.S. patent application Ser. No. 12/338,365, by Sorbe et al., titled "Transfer Account Systems, Computer Program Products, and Associated Computer-Implemented Methods" filed on the same day as this application, Dec. 18, 2008; U.S. patent application Ser. No. 12/338,402, by Sorbe et al., titled "Transfer Account Systems, Computer Program Products, and Associated Computer-Implemented Methods" filed on the same day as this application, Dec. 18, 2008; U.S. patent application Ser. No. 12/338,440, by Sorbe et al., titled "Transfer Account Systems, Computer Program Products, and Associated Computer-Implemented Methods" filed on the same day as this application, Dec. 18, 2008; and U.S. patent application Ser. No. 12/338,645, by Sorbe et al., titled "Transfer Account Systems, Computer Program Products, and Computer-Implemented Methods to Prioritize Payments from Preselected Bank Account" filed on the same day as this application, Dec. 18, 2008, each of which is incorporated herein by reference in its entirety.

Many modifications and other embodiments of the invention will come to the mind of those skilled in the art having the benefit of the teachings presented in the foregoing descriptions and the associated drawings. Therefore, it is to be understood that the invention is not to be limited to the illustrated embodiments disclosed, and that modifications and other embodiments are intended to be included within the scope of the appended claims.

The invention claimed is:

1. A system for providing prioritize payments directly from each of plurality of automatic deposits prior to being made available to one or more enrollees enrolled for prioritize payments, the system comprising:

a first computer being associated with a financial institution to thereby define a financial institution computer, the financial institution computer being configured to control a plurality of intermediary accounts with the financial institution, receive a plurality of electronic deposits from a plurality of depository institution computers through an automated clearing house network to define a plurality of automatic deposits, and to communicate with a plurality of second computers associated with a plurality of prepaid card processors to thereby define a plurality of prepaid card processor computers each being configured to control access to a plurality of prepaid card user accounts; and non-transitory computer memory encoded with computer program operable on the financial institution computer to perform a process of providing prioritize payments to one or more select creditors from the plurality of automatic deposits, the computer program comprising a set of instructions that when executed by the financial institution computer cause the financial institution computer to perform the operations of:

creating one or more of the plurality of intermediary accounts for each of a plurality of enrollees enrolled in prioritize payments with the financial institution, each of the intermediary accounts being inaccessible by the plurality of enrollees and adapted to receive funds for a benefit of one or more of the plurality of enrollees, debits from funds received by one or more of the intermediary accounts being controlled by the financial institution;

identifying one or more of the plurality of enrollees with one or more account identifiers listed in one or more received incoming ACH files, the one or more incoming ACH file being received from one or more of the plurality of depository institution computers and associated with one or more of the plurality of automatic deposits;

determining, responsive to identifying the one or more of the plurality of enrollees with the one or more account identifiers, a value of one or more unfilled pre-authorized payment requests associated with the one or more of the plurality of enrollees with the one or more account identifiers to define one or more prioritize payments, the one or more unfilled pre-authorized requests being made by one or more select creditors, generating the one or more prioritize payments from one or more of the plurality intermediary accounts with the one or more account identifiers to the one or more select creditors responsive to determining the value of the one or more prioritize payments, the one or more prioritize payments being directly deducted from the one or more of the plurality of automatic deposits, and generating a payment from the one or more of the plurality intermediary accounts to one or more of the plurality of prepaid card user accounts for the benefit of the one or more of the plurality of enrollees, a value of the payment being a value of the one or more of the plurality of automatic deposits less the value of the one or more prioritize payments to thereby define the one or more sweep payments, the one or more of the plurality of enrollees only having access to one or more of the plurality of the automatic deposits less the one or more prioritize payments.

2. A system as defined in claim 1, wherein one or more of the unfilled payment requests are initiated in response to a query from the financial institution computer responsive to the financial institution computer identifying the one or more of the plurality of enrollees with the one or more account identifiers; and wherein the one or more sweep payments are generated within twenty-four hours of receiving the incoming ACH file.

3. A system as defined in claim 2, wherein each of the plurality of prepaid card user accounts are associated with a prepaid card, wherein the one or more sweep payments are define as the value of the one or more of the plurality of automatic deposits less the value of the one or more prioritize payments and less any fees for providing the prioritize payments, and wherein the generating the one or more prioritize payments to the one or more select creditors step further includes the value of the one or more prioritize payments comprises a first value for a first time period and a second value different than the first value for a second time period different from the first time period.

4. A system as defined in claim 1, wherein the one or more of the plurality of automatic deposits includes one or more of the following: an employer-initiated direct deposit of payroll; a government-initiated electronic transfer of benefits payment; and a bank-initiated payment to a merchant for credit card sales, and wherein the one or more prioritize payments are customer-initiated payments, including one or more of the following: a gift card purchase, a remittance to family located outside of a country where an account holder is located, and a bill payment to a third-party.

5. Non-transitory computer memory encoded with computer program on a first computer being associated with a financial institution to thereby define a financial institution computer configured to control access to a plurality of intermediary accounts associated with the financial institution, receive a plurality of electronic deposits from a plurality of depository institution computers through an automated clearing house network to define a plurality of automatic deposits, and to communicate with a plurality of second computers associated with a plurality of prepaid card processors to thereby define a plurality of prepaid card processor computers each being configured to control access to a plurality of prepaid card user accounts, the computer program operable to provide prioritize payments directly from one or more of the plurality of automatic deposits prior to being made available to one or more enrollees enrolled for prioritize payments and comprising a set of instructions that when executed by the financial institution computer cause the financial institution computer to perform the operations of:

creating one or more of a plurality of intermediary accounts for each of a plurality of enrollees enrolled in prioritize payments with the financial institution, each of the intermediary accounts being inaccessible by the plurality of enrollees and adapted to receive funds for a benefit of one or more of the plurality of enrollees, debits from funds received by one or more of the intermediary accounts being controlled by the financial institution;

identifying one or more of the plurality of enrollees with one or more account identifiers listed in one or more received incoming ACH files, the one or more incoming ACH file being received from one or more of the plurality of depository institution computers and associated with one or more of a plurality of automatic deposits;

determining, responsive to identifying the one or more of the plurality of enrollees with the one or more account identifiers, a value of one or more unfilled pre-authorized payment requests associated with the one or more of the plurality of enrollees with the one or more account identifiers to define one or more prioritize payments, the one or more unfilled pre-authorized requests being made by one or more select creditors, generating the one or more prioritize payments from one or more of the plurality intermediary accounts with the one or more account identifiers to the one or more select creditors responsive to determining the value of the one or more prioritize payments, the one or more prioritize payments being directly deducted from the one or more of the plurality of automatic deposits, and generating a payment from the one or more of the plurality intermediary accounts to one or more of the plurality of prepaid card user accounts for the benefit of the one or more of the plurality of enrollees, a value of the payment being a value of the one or more of the plurality of automatic deposits less the value of the one or more prioritize payments to thereby define one or more sweep payments, the one or more of the plurality of enrollees only having access to one or more of the plurality of the automatic deposits less the one or more prioritize payments.

6. Non-transitory computer medium as defined in claim 5, wherein one or more of the unfilled payment requests are initiated in response to a query from the financial institution computer responsive to the financial institution computer identifying the one or more of the plurality of enrollees with the one or more account identifiers.

7. Non-transitory computer medium as defined in claim 6, wherein each of the plurality of prepaid card user accounts are associated with a prepaid card, wherein the sweep payment is define as the value of the automatic deposit less the value of the one or more prioritize payments and less any fees for providing the prioritize payments, and wherein the generating the one or more prioritize payments to the one or more select creditors step further includes the value of the one or more prioritize payments comprises a first value for a first time period and a second value different than the first value for a second time period different from the first time period.

8. Non-transitory computer medium as defined in claim 5, wherein the one or more of the plurality of automatic deposits includes one or more of the following: an employer-initiated direct deposit of payroll; a government-initiated electronic transfer of benefits payment; and a bank-initiated payment to a merchant for credit card sales, and wherein the one or more prioritize payments are customer-initiated payments, including one or more of the following: a gift card purchase, a remittance to family located outside of a country where an account holder is located, and a bill payment to a third-party.

9. Non-transitory computer medium as defined in claim 5, wherein enrollment for prioritize payments are required as a condition of a loan, wherein accounts for the one or more select creditors are remote from the financial institution computer and the plurality of the prepaid card processors, and wherein the computer program causes the financial institution computer to perform the operation of: deducting a fee from the one or more sweep payments.

10. Non-transitory computer medium as defined in claim 5, wherein the computer program causes the financial institution computer to perform the operation of: generating fees for the financial institution for the one or more prioritize payments to the one or more select creditors; and wherein the one or more sweep payments are generated within twenty-four hours of receiving the incoming ACH file.

11. Non-transitory computer medium as defined in claim 5, wherein the financial institution is a federally-chartered bank subject to federal banking laws and regulations and not subject to state banking laws and regulations.

12. A computer-implemented method to be performed by a first computer being associated with a first financial institution to thereby define a first financial institution computer configured to control access to a plurality of intermediary accounts associated with the financial institution, receive a plurality of electronic deposits from a plurality of depository institution computers through an automated clearing house network to define a plurality of automatic deposits, and to communicate with a plurality of second computers associated with a plurality of second financial institutions to thereby define a plurality of second financial institution computers each being configured to control access to a plurality of customer user accounts, the computer-implemented method to perform a process of providing prioritize payments directly from one or more of the plurality of automatic deposits prior to being made available to one or more enrollees enrolled for prioritize payments, the method comprising:

creating, by a computer associated with a first financial institution to define a first financial institution computer, one or more of a plurality of intermediary accounts for each of a plurality of enrollees enrolled in prioritize payments with the financial institution, each of the intermediary accounts being inaccessible by the plurality of enrollees and adapted to receive funds for a benefit of one or more of the plurality of enrollees, debits from funds received by one or more of the intermediary accounts are controlled by the financial institution;

identifying, by the first financial institution computer, one or more of the plurality of enrollees with one or more account identifiers listed in one or more received incoming ACH files, the one or more incoming ACH file being received from one or more of the plurality of depository institution computers and associated with one or more of a plurality of automatic deposits;

determining, by the financial institution computer responsive to identifying the one or more of the plurality of enrollees with the one or more account identifiers, a value of one or more unfilled pre-authorized payment requests associated with the one or more of the plurality of enrollees with the one or more account identifiers to define one or more prioritize payments, the one or more unfilled pre-authorized requests being made by one or more select creditors, generating, by the financial institution computer, the one or more prioritize payments from one or more of the plurality intermediary accounts with the one or more account identifiers to the one or more select creditors responsive to determining the value of the one or more prioritize payments, the one or more prioritize payments being directly deducted from the one or more of the plurality of automatic deposits, and generating, by the first financial institution computer, a payment from the one or more of the plurality intermediary accounts to one or more of the plurality of prepaid card user accounts for the benefit of the one or more of the plurality of enrollees, a value of the payment being a value of the one or more of the plurality of automatic deposits less the value of the one or more prioritize payments to thereby define one or more sweep payments, the one or more of the plurality of enrollees only having access to one or more of the plurality of the automatic deposits less the one or more prioritize payments.

13. A computer-implemented method as defined in claim 12, wherein one or more of the unfilled payment requests are initiated in response to a query from the first financial institution computer responsive to the first financial institution computer identifying the one or more of the plurality of enrollees associated with the one or more account identifiers.

14. A computer-implemented method as defined in claim 13, wherein each of the plurality of customer user accounts are demand accounts and are associated with a debit card, wherein the sweep payment is define as the value of the automatic deposit less the value of the one or more prioritize payments and less any fees for providing the prioritize payments, and wherein the generating the one or more prioritize payments to the one or more select creditors step further includes the value of the one or more prioritize payments comprises a first value for a first time period and a second value different than the first value for a second time period different from the first time period.

15. A computer-implemented method as defined in claim 12,
wherein the one or more of the plurality of automatic deposits includes one or more of the following: an employer-initiated direct deposit of payroll; a government-initiated electronic transfer of benefits payment; and a bank-initiated payment to a merchant for credit card sales, and
wherein the one or more prioritize payments are customer-initiated payments, including one or more of the following: a gift card purchase, a remittance to family located outside of a country where an account holder is located, and a bill payment to a third-party.

16. A computer-implemented method as defined in claim 12, wherein enrollment for the prioritize payment is required as a condition of a loan, wherein accounts for the one or more select creditors are remote from the first financial institution computer and a plurality of the second financial institution computers associated with the plurality customer user accounts, and
wherein the method further comprising: deducting a fee from the one or more prioritize payments.

17. A computer-implemented method as defined in claim 12, the method comprising: generating fees for the first financial institution for prioritize payments to the one or more select creditors; and wherein the one or more sweep payments are generated within twenty-four hours of receiving the incoming ACH file.

18. A computer-implemented method as defined in claim 12, wherein the first financial institution is a federally-chartered bank subject to federal banking laws and regulations and not subject to state banking laws and regulations.

19. A computer-implemented method as defined in claim 12, wherein each of the plurality of customer user accounts are prepaid card accounts and are associated with a prepaid card, wherein the one or more sweep payments are define as the value of the automatic deposit less the value of the one or more prioritize payments and less any fees for providing the prioritize payments.

20. A computer-implemented method as defined in claim 19, wherein one or more of the unfilled payment requests are initiated in response to a query from the first financial institution computer responsive to the first financial institution computer identifying the one or more of the plurality of enrollees associated with the one or more account identifiers.

* * * * *